United States Patent [19]

Davis et al.

[11] 4,254,467
[45] Mar. 3, 1981

[54] VECTOR TO RASTER PROCESSOR

[75] Inventors: Jack R. Davis, Boulder Creek; Philip S. Gold, Santa Clara, both of Calif.

[73] Assignee: Xerox Corporation, Stamford, Conn.

[21] Appl. No.: 45,374

[22] Filed: Jun. 4, 1979

[51] Int. Cl.³ ............................................. G06F 3/14
[52] U.S. Cl. .................................... 364/521; 340/739; 364/515
[58] Field of Search .............. 364/515, 520, 521, 719; 340/720, 730, 739

[56] References Cited

U.S. PATENT DOCUMENTS

| | | | |
|---|---|---|---|
| 3,430,207 | 2/1969 | Davis | 364/900 |
| 3,438,003 | 4/1969 | Bryan | 364/900 |
| 3,449,721 | 6/1969 | Dertouzos et al. | 364/900 |
| 3,544,972 | 12/1970 | Trousdale | 364/900 |
| 3,634,828 | 1/1972 | Myers et al. | 364/200 |
| 3,895,357 | 7/1975 | Schwartz et al. | 364/200 |
| 4,016,554 | 4/1977 | Evans et al. | 364/521 X |
| 4,023,025 | 5/1977 | Rowe et al. | 364/900 |
| 4,024,505 | 5/1977 | Sperling | 364/200 |
| 4,146,925 | 3/1979 | Green et al. | 364/521 |
| 4,163,286 | 7/1979 | Reins et al. | 364/719 |

Primary Examiner—Jerry Smith
Attorney, Agent, or Firm—W. Douglas Carothers, Jr.

[57] ABSTRACT

In raster data plotting of graphic information, vector data comprising the plot is generated by the host computer via the user's application program. For maximum plotter efficiency and relief of host system time, vector to raster conversion is carried out by an offloading processor which receives vector data ordered in vector bands constituting the plot. Vector data in each band is received in random order and is initialized for vector computational values. The computational values for each vector are stored in parallel format in a vector memory in the initialized random order for subsequent retrieval in parallel format for vector to raster processing of each scan line of the band and then restored in parallel format in the vector memory if the vector is still active. A vector type, designating vector orientation relative to Cartesian coordinates, is one of the computational values for each vector. The time required for vector to raster conversion is further enhanced by processing each vector directly according to its vector type found in the microcode of the processor.

11 Claims, 30 Drawing Figures

| VECTOR | IX0 | IY1 | NDLTX | IY2 | (IX1) | (IY1) | (IX2) | (IY2) |
|---|---|---|---|---|---|---|---|---|
| INITIALIZE | -1 | -1 | 880* | 10** | | | | |
| END OF 8 BANDS | -1 | 0 | 0 | 8 | | | | |
| V1 | 5 | 185 | 65 | 250 | 85 | 185 | 150 | 250 |
| END OF 2 BANDS | -1 | 0 | 0 | 2 | | | | |
| V2 | 0 | 100 | 100 | 100 | 100 | 100 | 200 | 100 |
| V3 | 0 | 100 | 0 | 200 | 100 | 100 | 100 | 200 |
| V4 | 0 | 200 | 100 | 200 | 100 | 200 | 200 | 200 |
| END OF 5 BANDS | -1 | 0 | 0 | 5 | | | | |
| V5 | 0 | 250 | 65 | 185 | 150 | 250 | 215 | 185 |
| END OF 5 BANDS | -1 | 0 | 0 | 5 | | | | |
| V6 | 0 | 200 | 0 | 100 | 200 | 200 | 200 | 100 |
| END OF PLOT | -1 | 1 | 0 | 0 | | | | |

\* ISCAN
\*\* NSCAN

FIG. 26

VECTOR TO RASTER PROCESSOR

BACKGROUND OF THE INVENTION

This invention relates to the preparing of vector data forming a plot, such as a line traces, graphs, geographic maps, etc. into raster data and more particularly the preparation vector data in vector band format for conversion into raster scan format in a high speed and efficient manner.

The conversion of known line information having Cartesian coordinate values forming a plot into a raster scan format for display on an image device or printout on a serial line printer is known in the art. Example of such conversions are illustrated in U.S. Pat. Nos. 3,430,207; 3,449,721 and 3,895,357. In general, vector information representing the various lines comprising the entire plot is received in the form of beginning and ending coordinates which may further be broken down in vector segments. This information may be encoded to form binary for the various vectors which are subsequently stored and retrieved for processing to form a series raster scan lines with values set in each line representing a line increment of the total vector or vectors "traversing" each such scan line. For line vectors that traverse laterally relative to the original x-y Cartesian coordinates, x and y values are generated from coordinate information and an algorithm is employed to calculate the slope of the line vector to properly position the line increment in each scan line as processed. An example of slope approximation for line vectors is shown in U.S. Pat. No. 3,544,972.

In recent times, electrostatic printer/plotters and electrostatic plotters have become popular for hard copy print out of graphic or plot information with on line host computer systems using graphics utility software in conjunction with a users application program. Such plotters include an array of electrodes or nibs which extend across a recording medium with the medium being incremented in a direction transverse to the nib array. On the opposite side of the medium is a plurality of counterelectrodes in vis-a-vis position to the nib array. The nibs are counterelectrodes and may be electrically addressed in a manner to provide deposits of charge in form of latent charge dots on the surface of incremented recording medium. The toner development of these latent charge dots provides a visible image. For further understanding of these printer/plotters, reference may be made to U.S. Pat. No. 4,054,885.

Vector processing systems for this type of printer/plotter operate within a conventional Cartesian coordinate system wherein line vectors are defined in terms of nib (dot) coordinates based upon the resolution (dots-/inch) of the particular plotter. The origin of the coordinate system is based upon the first nib on the first writable scan line of the plot to be created, with the +y axis extending across the width of the recording medium and the +x axis extending in a direction opposite to incremental paper movement.

There is generally three phases in processing vector information from a host system employing graphics utility software. There is the vector generation phase, the vector ordering (including orientation) phase and vector to raster phase. In the vector generation phase, the host system resolves the application units of measure into the integer nib coordinate system of the plotter. In the vector ordering phase, the vectors, accumulated for a single plot, are ordered to the direction of the recording medium and are "sorted" into bands forming link chains, together which constitute the entire plot. In the third phase, the band ordered vectors are then processed into raster scan lines of incremental vector information. The raster scan information is stored until an entire band has been converted, at which time the information is sent on to the plotter for printout.

In general, the vector to raster conversion requires the most amount of the processing time of the host system. Also, the host system is not capable of rasterizing vector data at a rate sufficient to drive the plotter at its maximum plotting speed.

What is, therefore, desirable is to employ the plotter more efficiently, i.e., at higher output per unit time while also reducing the rasterization time and save host computer time by offloading vector to raster processing.

Available is an offloading vector to raster processor manufactured by Varian Associates of Palo Alto, Calif. under the registered trademark, GRAPHWARE. Under the operation of this processor, multiple readings, writings and processing for each vector is necessary by the processor and complete handling of the vector ordering with the organized bands of vector information is done by the host system. What is more desirable for plotter efficiency is to raster process vector data even more quickly with final fine vector ordering being also accomplished by the offloading vector to raster processor.

SUMMARY OF THE INVENTION

According to this invention, a vector to raster processor converts vector data into raster scan format in an efficiently fast and effective manner by parallel processing of all vector computation values, the parallel processor capable of storing and accessing such values in parallel format from vector storage means. Vectors for each band of plot information are initialized by the processor to determine the vector computation values which are queued into vector storage means in parallel format. The vectors in the band may be received in random order, i.e., they need not be ordered to the beginning scan line in the band. This final ordering is accomplished by the vector to raster processor. The vector computation values may be dequeued from the vector storage means in parallel format with each value being simultaneously processed for the current scan line and requeued in parallel format to the vector storage means if the vector is not yet active within current vector band being processed or if the vector is still active within the current vector band.

Also the vector storage means is provided with an inqueuing function wherein vector data for the next vector band can be received from the host system, initialized for vector computational values and inqueued into the vector storage means during the period of time that the rasterized data for the previous scan line is placed on output to the plotter.

Also, according to the present invention, vector type is designated as one of the vector computation values and vector processing time can be materially reduced by processing the vector according to an identified coordinate orientation. Code designation for seven vector types is employed to direct vector to raster conversion to follow one of seven microcode subroutines.

In the present invention, the concept of vector banding is employed and is believed not to have been used prior to this time. Vectors are ordered by the host system in bands dependent on the density of the plot. With a large amount of vector memory storage, final vector ordering within the vector bands is carried out by the parallel format vector to raster processor. Prior art vector to raster processors traditionally operated under the concept of raster banding wherein vectors are ordered to bands according to the number of scan lines that can be processed and stored in raster memory prior to placing the scan lines on output to the plotter. Raster banding depends upon plotter resolution (dots/inch) and as plotter resolution doubles the vector ordering time required by the host quadrouples. Thus, plotter resolution can defeat the purpose of offloading when raster banding is employed. Vector banding on the other hand is independent of plotter resolution.

Other attainments together with a fuller understanding of the invention will become apparent and appreciated by referring to the following description and claims taken in conjunction with the accompanying drawings.

BRIEF DESCRIPTION OF THE DRAWINGS

In the Drawings:

FIG. 6 which comprises

FIG. 8 which comprises

FIG. 10 which comprises

FIG. 26 is an illustration of the coordinate components for the standard vectors and the operational components for the control vectors for the plot example shown in FIG. 25.

DETAILED DESCRIPTION OF THE PREFERRED EMBODIMENT

1. System

Figure 1:
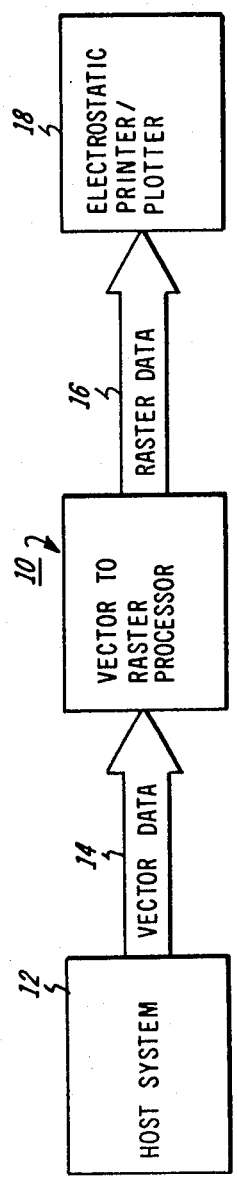
FIG. 1 is a block diagram representing the vector to raster processor of the present invention in an exemplary system.

FIG. 1 illustrates the general arrangement of a system in which a vector to raster processor 10, comprising this invention, is employed. The processor 10 is inserted between host system 12 and electrostatic printer/plotter 18 and has the capability of receiving plot information in the form of band ordered vector data 14 for final ordering of that information and conversion thereof to raster scan format for output as raster data 16 to the printer/plotter 18.

The purpose of the processor 10 is to remove the raster conversion function and a major portion of the vector ordering function from the host system thereby minimizing host time and storage requirements through the performance of this offloading function.

Processor 10 is concerned only with plot information, i.e., information in the form of graphs, drawings, maps, etc. Specific examples are the print out of engineering drawings, seismic plots, integrated circuit drawings, breadboard drawings, geographical maps and textile patterns and designs. The term, "printer/plotter" denotes the capability of printing both alphanumeric information and plot information. Processor 10 will act "transparent" to and pass on alphanumeric information to the electrostatic printer/plotter 18. However, it will become active and will perform the final ordering function and rasterization of vector information for a plot and output the raster information to the printer/plotter. Therefore, reference herein is actually being made only to the plotter capabilities of the printer/plotter 18.

Although an electrostatic type of printer/plotter 18 is depicted here and is used in the description of invention, it should be understood that the processor 10 can function with any plotter device which is capable of receiving information in a raster scan format.

The host system 12 may be a minicomputer system, such as, PDP-11/34 RSX-11M manufactured by the Digital Equipment Corporation. The electrostatic printer/plotter 18 may be a Versatec 36 inch wide plotter, Model 8136 having a 100 dot/inch resolution or Model 8236 having a 200 dot/inch resolution. With such a system using a plotter with a 200 dot/inch resolution, a plot 36 inches by 60 inches containing 250,000 vectors would require software ordered vector to raster conversion and output time from the host system 12 of 12.25 minutes without the use of the processor 10. With processor 10 offloading the minicomputer to perform the final ordering and the vector to raster conversion, the required time is 1.5 minutes. Thus, these functions can be carried out eight times faster for this given plot example.

Figure 2:
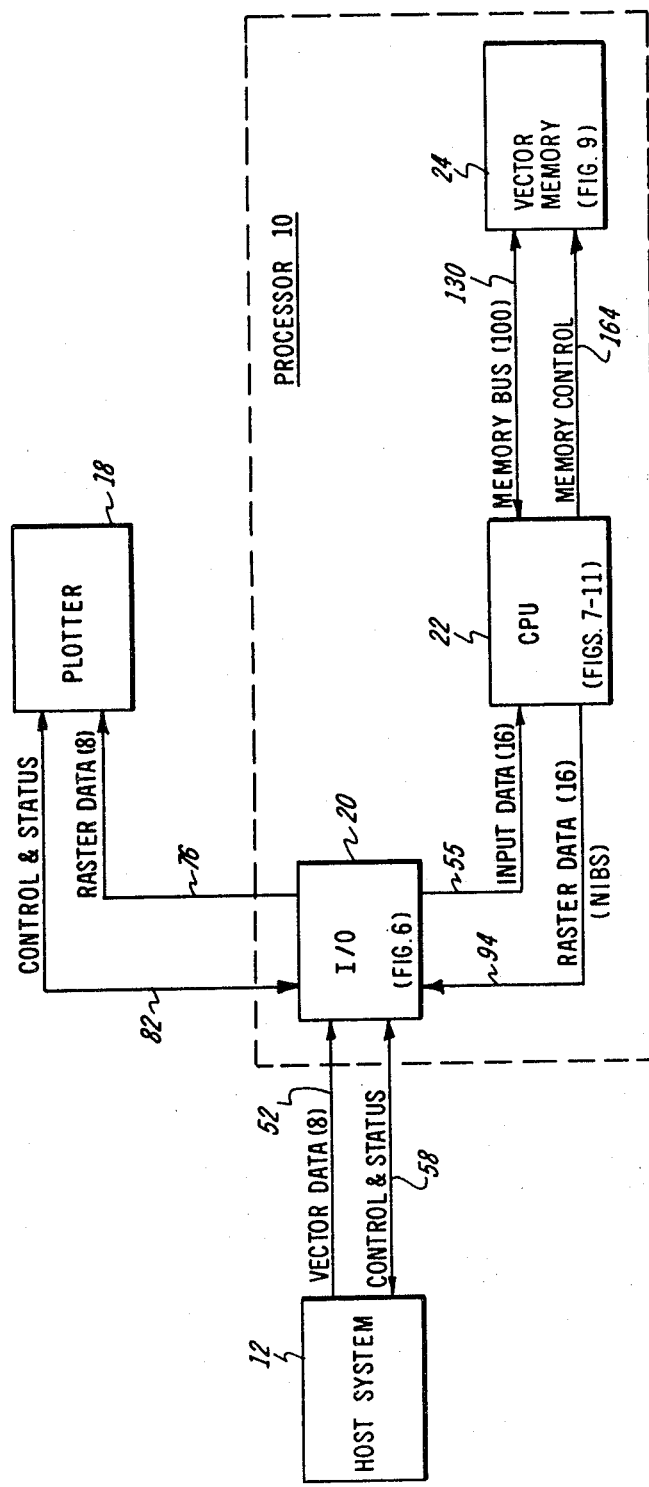
FIG. 2 is a more detailed block diagram of the vector to raster processor shown in FIG. 1.

In FIG. 2, the major components making up the processor 10 are shown. Processor 10 comprises three major components, an I/O interface 20, a central processing unit, CPU 22 and a vector memory 24. These three components are three different physical hardware boards making up the processor unit.

The I/O 20 is responsible for receiving information including vector data on an 8 bit parallel bus 52 from the host system as well as communicating with the host system via lines 58. I/O 20 operates, in general, in two different modes, a TRANSPARENT mode and an ACTIVE mode. In the TRANSPARENT mode, data passes alphanumeric or raster information unmodified through the I/O to the printer/plotter 18 via an 8 bit parallel bus 76.

The I/O 20 communicates with the host system 12 via status and control lines 58 to indicate, for example, that the printer/plotter 18 or the processor 10 is busy, depending on the mode, or that further data is ready to be received. Also this line, as coupled to the printer/plotter 18 via control and status line 82, would be employed to indicate to the host system (while in the TRANSPARENT mode) that the printer/plotter is off line or that the printer/plotter is out of recording medium.

The interface between the host system 12 and I/O 20 is essentially the same as the interface between the I/O 20 and the printer/plotter 18.

In the TRANSPARENT mode, a signal at lines 58 indicates to the processor 10 it is in its "pass through" state, that is, the processor transfers all incoming data directly through the I/O 20 to the printer/plotter 18 so that the processor 10 appears "transparent" to both the host system 12 and the printer/plotter 18. During the TRANSPARENT mode, the I/O 20 can be made to examine each data byte that passes on bus 52 for a special activate or escape code, which may be a nonprintable ASCII escape code, DC-1 or CAN (X'11'). When I/O 20 recognizes the escape code, the TRANSPARENT mode is interrupted and the processor 10 begins to operate in its ACTIVE mode. In the ACTIVE mode, the vector data received on bus 52 is routed to the CPU 22 along a 16 bit input data bus 55 for conversion of the vector data 14 to raster data 16.

Included with the escape code is a byte count, BYTCNT, is also sent by the host system 12 which specifies the number of data bytes to be processed by the processor 10. Processor 10 remains in the ACTIVE mode for the duration of the specified byte count. When the number of bytes specified have been processed, the processor 10 automatically reverts back to the TRANSPARENT mode.

In practice two bytes of information at a time are received on bus 52 in the I/O 20, they are parallel latched, and then routed along the bus 55 to the CPU 22 for processing. CPU 22 processes the vector data by first determining what type of vectors are involved, formatting the vector information, storing and accessing the formated vector information in and from the vector memory 24. The CPU 22 converts the vector information to raster data by generating dot addresses on the 16 bit address bus 94 to the I/O interface 22 to perform addressing operations in a scan line memory.

The CPU 22 maintains the vector data for a vector band received from the host system in the vector memory 24. Each vector received by the CPU 22 is initialized and each initialized vector is stored, in the order received, in the vector memory 24. CPU 22 may then access the vector memory 24 for processing the initialized vectors during raster conversion if the vector is "active" for particular scan line in the current vector band being processed. If the vector is "inactive" in the current band, the initialized vector is restored in the vector memory until it becomes "active". If the vector after processing is still "active" for subsequent scan lines in the band, it is restored in the active memory 24 for further processing. These accessing and storing functions are carried on between CPU 22 and the vector memory 24 by means of a 100 bit wide memory bus 130. Bus 130, as will be explained in greater detail later, is broken down into six 16 bit subbuses and one 4 bit subbus, each of these subbuses representative of a initialized vector computational value.

The CPU 22 communicates with the vector memory 24 via memory control bus 164 which contains information as to the address in which the CPU is reading or writing from within the memory as well as control signals as to whether a write or read enable function is to be performed.

The details of I/O 20, CPU 22 and vector memory 24 will be explained later.

2. Vector Processing

It is best to have a basic understanding of the format and nature of vector information, how it is received, how it generally processed, i.e., converted to raster format, and how it will appear at the printer/plotter.

a. Introduction

Figure 3:
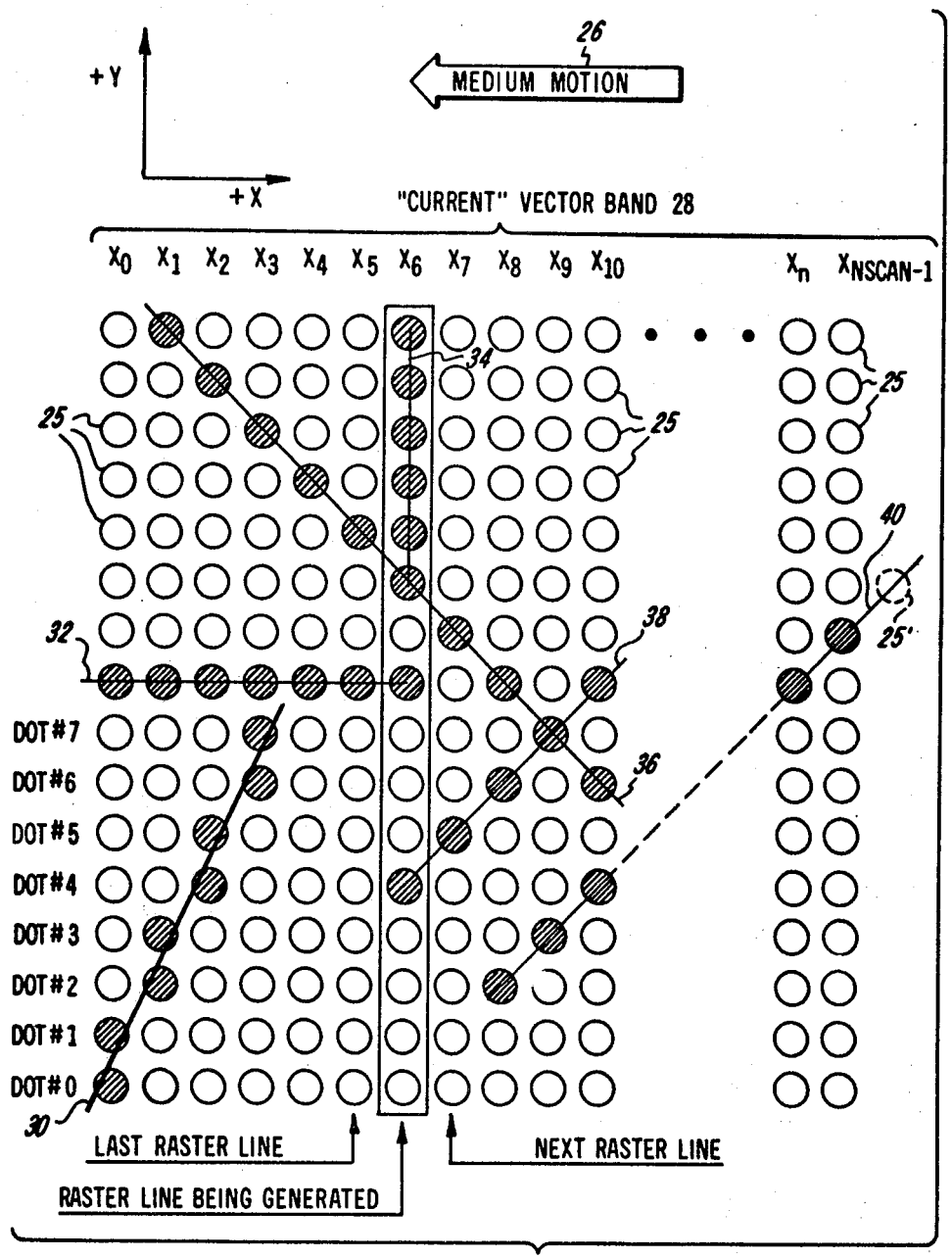
FIG. 3 is an exemplary plan view illustrating the dot matrix that may be generated from a plotter with examples of vectors in a single vector band.

The vectors, which together comprise a plot, are generated at the host system 12. Typically, the user's application program is drawing line movements in applicable units of measure. These line movements are translated into vector coordinates to fall into the nib coordinate system of the printer/plotter. A simplified nib coordinate system is illustrated in FIG. 3. Each of the circles 25 represent dots that might be produced on a moving recording medium in the plane of this figure, medium motion indicated by arrow 26. Each of the dots may be latently produced by an electrostatic discharge from a nib in the nib array of the printer/plotter. Although the nib array may actually consist of one or more parallel lines of nibs, proper signal addressing of the nibs can be used to create a visable image in the form of a plurality of connected dots 25. The dots 25 in FIG. 3 are shown separated for purposes of clarity. In actual practice they are very close together or made to overlap as just explained.

The Cartesian coordinates system of the printer/plotter is formed by the parallel nibs across the width of the medium representing +Y axis and the incremental movement of the medium representing the +X axis. The +X axis is in a direction opposite to medium motion 26. Between each incremental movement, a distance which is no greater than the diametrical extent of a nib or of a dot 25, the appropriate nibs are addressed and energized for each raster scan line, $X_\phi$ to $X_{n-1}$.

Vectors comprising the plot are converted into this integer nib coordinate system wherein vectors are defined as IX1 and IY1, the starting nib coordinate position and IX2 and IY2, the ending nib coordinate position.

If the vector density of the plot is small enough, the host system 12 can be made to generate all the vectors and forward them to the processor 10 without any vector ordering being carried out by the host system. In such a case, the storage capacity of the vector memory 24 is sufficient to store all the vectors of the plot for processing into raster scan format. For example, the processor 10 has been designed to store approximately 4,000 vectors. If the vector density of the plot is above this minimal capacity, then the plot must be divided up into a series of sections or bands within which the vectors can be processed by the CPU 22 while held within the capacity of the vector memory 24.

FIG. 3 illustrates a vector band 28, which is one of a multitude of bands that may comprise an entire plot. The designation, "current", means the band then being processed into raster scan format. The vector band 28 consists of a predetermined number of scan lines $X_\phi$ to $X_{NSCAN-1}$, where NSCAN equals the number of scan lines in each band. The NSCAN value for vector banding will vary based upon the density of vectors in the plot.

In band 28, six vectors are shown. Raster scan conversion is being currently carried out for scan line $X_6$, i.e., the vectors falling in and through this scan line $X_6$ are being processed for that line and sent on to the printer/plotter 18. Vector 30 in band 28 has been previously processed and is completed. Vector 32, a X only vector, is an active vector, and is being completed with scan line $X_6$ and, therefore will not require any queuing to the vector memory 24 for storage. Vector 34 is a Y only vector which begins and ends within the scan line $X_6$ and is processed immediately requiring no further vector storage. Note that vector 34 had an "inactive" status in band 28 until processing of scan line $X_6$. Vector 36 is an active vector and is being processed for scan line $X_6$ and will be requeued to vector memory 24 for subsequent processing. Vector 38, previously inactive, has now become active starting with scan line $X_6$ and will remain active requiring queuing to the memory 24 and dequeuing for further processing of the next several scan lines including scan line $X_{10}$. Vector 40 starts on scan line $X_8$, which scan line has not yet been processed. Vector 40 is considered as an inactive vector within the current vector band 28. Also, vector 40 extends into the "next" vector band as indicated by dot 25', which is in scan line $X_\phi$ in next succeeding band. Thus, when the current vector band 28 has been completely processed, vector 40 will remain active and the vector information for vector 40 will remain in the memory 24 and be included with the vector information placed in the memory for the "next" vector band, which becomes the "current" band upon processing the last scan line $X_{NSCAN-1}$ of band 28.

b. Vector Banding

The software approach in the past, as previously mentioned in the background relative to vector to raster conversion, has been "raster banding" wherein the output memory of a processor we allocate a band of some number of scan lines, which number depends on the capacity of the memory. This is calculated by taking the number of bytes required for each scan line divided by the amount of memory available. The result defines the band size that is to be employed by the host system in ordering vectors to a band size.

The problem with raster banding is that as the resolution (dots/inch) of the plotter increases, the size of the raster band decreases due to the increase of raster bytes per band and scan lines per band (assuming a fixed raster memory capacity).

For example, a one inch band of plot information comprising 100 scan lines in the band with 100-8 bit bytes per scan line and having a plotter resolution of 100 dots/inch becomes a quarter inch band at a plotter resolution of 200 dots/inch. This is because the host system has four times more the vector ordering overhead. More bytes of information must be established by the host system for increased resolution at the plotter. In the example, the amount of raster memory necessary to hold the one inch band in raster memory for output to the plotter would be 10,000 byte memory. Employment of 200 dot/inch resolution at the plotter will require a memory of 40,000 bytes for the same one inch band of 100 scan lines (200 bytes per scan line times 200 scan lines per band equals 40,000 bytes per band). For the same raster memory, therefore, the band size would have to be reduced to 50 scan lines (50 scan lines times 200 bytes per scan line equals 10,000 bytes of memory which is the amount of memory available).

Under the concept of vector banding, the size of the band is dependent upon the vector density of the plot but is independent of the resolution of the plotter. Given the same plot density and a given vector memory capacity, the size of the vector band is the same even where the plotter resolution is increased. In such a case, the number of vectors to be processed by the CPU 22 is the same except that the number raster lines and the number of dots to be set per raster line is increased. High speed vector to raster conversion and high speed vector memory access in a parallel format by the CPU 22 can effectively compensate for increase plotter resolution, that is, can effectively compensate for increase in dots/inch per raster line and the increase in the number of raster lines to be processed.

It is more effective to enlarge vector memory capacity than to require a larger raster memory because with raster banding, one must either increase the work load on the host system to process the addition bytes of information or quadruple the amount of raster memory. With vector banding, the addition to vector memory provides the capability of handling more complex plots and the maintanence of large amounts of offloading from the host system.

c. Vector Computation

Reference is now made to the type of vector information received from the host system and how this information is generally interpreted and processed by the CPU 22.

When processor 10 is operating in the TRANSPARENT mode, a search is made for an activate code as the data bytes are received online. After an activate code is received, the processor 10 is switched to the ACTIVE mode. The first byte information the processor expects to receive is a control vector. This particular contol vector is an initialize plot command, which sets up the processor and vector memory for processing. This command also provides the band size, termed NSCAN, and the plotter resolution, termed ISCAN. ISCAN, representing the number of bytes per scan line, is employed during the output cycle of the raster information to indicate to the plotter how many bytes are present in each scan line. NSCAN representing the number of scan lines per band or the number of scan lines between END OF BAND commands, as will be more evident later.

Figure 4A:
FIG. 4a is a graphic illustration of the sequential order that the types of vectors are received by the processor.
Figure 4:
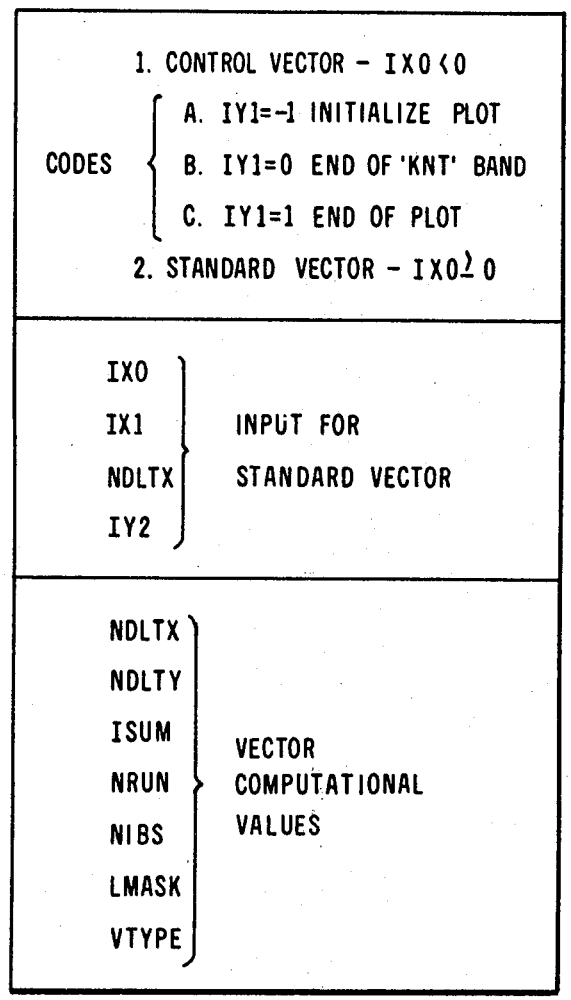
FIG. 4 illustrates the types of vectors involved in the vector to raster conversion and their computational components.

There are several types of control vectors which are noted in FIG. 4. There is an initialize plot command, an END OF 'KNT' BAND (EOB) command, 'KNT' meaning the number of bands to be next processed before receipt of further standard vectors, and an END OF PLOT (EOP) command.

The other type of vector is a standard vector. This type of vector is a plot vector and, as previously indicated, is defined by two pairs of X, Y coordinates, i.e., X1, Y1 and X2, Y2. For processor 10, these starting and ending coordinates have been translated into four values at the host system IX$\phi$, IY1, NDLTX, and IY2. NDLTX is the delta X value (incremental change in X direction) and is the value IX2 minus IX1. This value is ordered in the plus X direction if not already originally transposed with a plus X orientation. The X1 value is changed into the relative $X_{n-1}$ scan line value for the vector band. Thus, IX$\phi$ is not the starting coordinate, X1, of the vector but rather the starting scan line within the particular band being processed. The IY1 and IY2 values are equal to the Y1 and Y2 values of the vector and relate to the corresponding Y nib position along the +X direction.

Both control and standard vectors have four possible values each value being 16 bits. The IX$\phi$ value for a control vector is less than zero or negative. A standard vector is equal to or greater than zero. The IY1 value for a control vector designates the type of control vector. If this value is a −1, the control vector is an initialize plot command. If the IY1 value is zero, the control vector is an EOB command. If the IY1 value is equal +1, the control vector is an EOP command. The NDLTX position of the control vector code serves no purpose for EOB or EOP commands but for an initialize plot command signifies to the processor 10 the resolution of the plotter, ISCAN. The IY2 for initialize plot command signifies the number of scan lines per band, NSCAN. The IY2 position for an EOB command specifies the 'KNT' value, i.e., the number of bands to be next processed. For example, if the 'KNT' value is 2, this means that two bands of vectors are to be processed before further standard vector information is to be received beginning in the next succeeding band. The IY2 position for the EOP command has no functional purpose.

As shown in FIG. 4a, the EOB control vectors are interspersed between vector band $\phi$, 1, and n−1. The first vector received is an initialize plot command, followed by vectors for band $\phi$. After receipt and initialization of vectors for band $\phi$, an EOB control vector is received followed by the standard vectors for the subsequent band, band 1. After receipt of the last vector band, band n−1, a EOP control vector command is received from the host system which indicates to the processor that there is no more vector information for the particular plot in process, and to complete the processing of all remaining standard vectors to their termination. At this time processor 10 will revert to its TRANSPARENT mode and, if the host system is still on line, will look for another activate code.

Standard vector values may represent vectors that start in a designated band of the plot and extend across one or more scan lines in the same band where they begin and may extend across one or more subsequent bands.

For processing standard vectors and computing the vector to raster conversion, the four vector input values, IX$\phi$, IY1, NDLTX, and IY2, are converted into a seven entity format. These seven entities of vector computational values are shown in FIG. 4. The NDLTX value is the same delta X value from the vector input from the host system. The NDLTY value is the delta Y value equal to IY2 minus IY1, the incremental change in the Y axis direction. The ISUM value is initially set equal to one-half the major delta move, that is, the NDLTX value or the NDLTY value, whichever value is the greater. The larger of the two NLDT values is termed the major move and the smaller of the two NDLT values is termed the minor move. This value is used in a summation accumulator for performing the slope approximation. The NRUN value is the number of dots to be set for a particular vector from its beginning position until its ending position. The initial value for the NRUN value is either the NDLTX or the NDLTY value whichever is greater, i.e., the major move NDLT value. The NIBS value is the nib address to be set in the particular scan line under going processing and its initial value will be set to the IY1 value, which is the nib position on the starting scan line of the vector. The IY2 value is the ending nib position on the ending scan line of the vector such that, the final value of NIBS will equal IY2.

LMASK is a value used to designate the type of line that is to be generated to represent a vector, for example, a solid line, a dotted line, a dashed line or special case intermittent line or the creation of half tone images.

Figure 5:
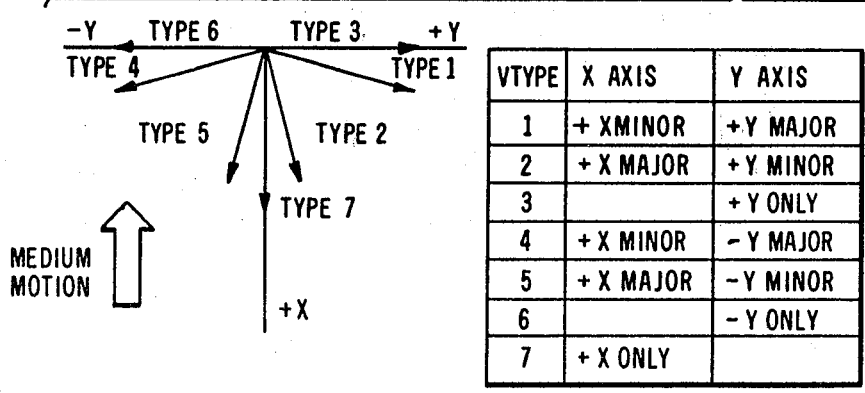
FIG. 5 illustrates the vector types indicative of vector orientation.

VTYPE represents the vector type. Seven vector types are possible as shown in FIG. 5. The vector type is related to its particular orientation in the X-Y coordinate system. This value is essentially a designation as to which axis represents the major move and which axis represents the minor move.

There are 16 bits employed to represent each of the values for NDLTX, NDLTY, ISUM, NRUN, NIBS and MASK. There are 4 bits designated for the VTYPE value, although in practice a three bit code is used to represent the seven vector types.

The vector computations essential for vector processing are NDLTX, NDLTY, ISUM and NIBS. LMASK and VTYPE are not absolutely essential to vector processing. However, without these values, vector processing to raster scan would be much more time consuming. For example, without LMASK, a vector would need to be generated by the host system for each dash or dot making up a full dash or dotted line. This would take more host time to generate these mini vectors and take more time for the vector to raster processor to process them. The LMASK designation permits treatment of these types of lines as single vector and later establishment of the special type of line to be actually generated.

Vector type has the advantage of also saving processing time by directing processing of a vector directly to a specially created microcode subroutine designed specifically to handle the particular type of vector.

For a vector at 45 degrees relative the X and Y coordinates, the VTYPE designation may be either TYPE 1 or TYPE 2, if in the +X, +Y quadrant, or may be either TYPE 4 or TYPE 5, if in the +X, −Y quadrant. This is a special case for the ISUM value where there are equal incremental changes in the X and Y direction for each X scan line. Vectors 36, 38 and 40 in FIG. 3 are of this special type.

There is also a VTYPE value, $\phi$, which is employed for an inactive vector in the current vector band. For those vectors that have been received in the current band and have an IX$\phi$ value not yet in process, a VTYPE $\phi$ designates that it is inactive at this particular time of processing. When it becomes active, the proper VTYPE designation is given to the vector. For this type of situation, the NRUN value is initially set to the IX$\phi$ for the current band being processed and this value is decremented until the X scan line, IX$\phi$, is reached, at which time the vector becomes active. The processor will set the VTYPE value to one of the seven vector types depending on the major move and minor move (NDLTX and NDLTY values) and will increment the NRUN value to the major move value whichever is the greater, NDLTX or NDLTY.

For better understanding of the ISUM value and its processing, the following example is given in connection with vector 30 in FIG. 3. Vector 30 has a IX$\phi$ value of zero, a IY1 value of zero and IY2 value of 7. Vector 30 has a NDLTX value of 3 (3-0) and a NDLTY value of 7(7-0). Therefore, NDLTY is the major move and NDLTX is the minor move. In processing vector 30, there will always be a move in the major move direction (+Y) and there may or may not be a move in the minor move direction (+X). Slope approximation is brought about by calculating the ratio of the delta Y value to the delta X value using the differential-sum process.

The NIBS value will be set to the IY1 value of zero, which is the position of the nib to be set in the first scan line, X$\phi$. The LMASK value is set with all bit values on or "1". The VTYPE value is set to TYPE 1.

The NRUN value is set equal to 7, representing the number of raster dots minus one to be set. The ISUM value is set equal to be one-half the major move delta which is 7 divided by 2 or 3.5 which is rounded off to the lower integer value, 3.

Vector 30 begins in scan line X$_{100}$ so that this vector becomes immediately active in the current vector band 28. If vector 30 began on scan line X$_8$, the NRUN value would have been set initially to IX$\phi$ or 9 and the VTYPE value set to zero. When processing reaches scan line X$_8$, NRUN will be equal to zero and the processor would increment NRUN to the major move delta, which is 7, and designate the VTYPE as VTYPE 1, which is derived from NDLTX and NDLTY values wherein the major move is along the +Y axis and the minor move is along the +X axis.

ISUM processing beginning at scan line X$\phi$ is shown in Table 1. Note that the initial dot $\phi$ at the IY1 value (0,0) is set and NRUN is decremented by one.

TABLE I

| | NRUN | | | ISUM | |
|---|---|---|---|---|---|
| Set to | 7 | 7 dots remaining to be set | Set to | 3 (7/2) | Set dot $\phi$ |
| dot 1 | −1 | | minor delta X value | −3 | |
| | 6 | | ISUM ≧ $\phi$; MMO | 0 | set dot 1 |
| dot 2 | −1 | | decrement delta X | −3 | |
| | 5 | | ISUM < $\phi$; M&MM | −3 | set dot 2 |
| dot 3 | −1 | | add major value | +7 | ISUM restore to ≧ 0 |
| | 4 | | | 4 | |
| dot 4 | −1 | | decrement delta X | −3 | |
| | 3 | | ISUM ≧ $\phi$; MMO | 1 | set dot 3 |
| dot 5 | −1 | | decrement delta X | −3 | |
| | 2 | | ISUM < $\phi$; M&MM | −2 | set dot 4 |
| dot 6 | −1 | | add major value | +7 | ISUM restored to ≧ 0 |
| | 1 | | | 5 | |
| dot 7 | −1 | | decrement delta X | −3 | |
| | 0 | | ISUM ≧ $\phi$; MMO | 2 | set dot 5 |
| | | | decrement delta X | −3 | |
| | | | ISUM < $\phi$; M&MM | −1 | set dot 6 |
| | | | add major value | +7 | ISUM restored to ≧ 0 |
| | | | | 6 | |
| | | | decrement delta X | −3 | |
| | | | ISUM ≧ $\phi$; MMO | 3 | set dot 7 |

MMO means a "major move only"
Finished — NRUN = 0
M&MM means both a "major and minor move"

For each increment in the major move direction, the absolute value of the minor move delta is decremented from the ISUM value. Here, the minor move value is 3. If the ISUM value is equal to or greater than zero, "division" is not complete and there is, therefore, only a increment made in the major move direction (MMO) and a dot is set by the NIBS value. If the ISUM value is less than zero, the division is complete and an increment is made both in the minor and major move directions (M&MM) and a dot is set by the NIBS value. The ISUM value is then restored to a positive value by adding the absolute value of the major move, which, in the case here is equal to 7. This process is repeated until the NRUN value equals zero.

For the beginning of band 28 and initialization of vector 36, the ISUM calculations will be done the same way except that there would be an increment in the major and minor move directions each time since vector 36 is 45 degree vector. Note that its IX$\phi$ value is 1, IY1 value is 15, NDLTX value is 9(10-1) and its NDLTY value is 9(15-6). It has a IY2 value of 6. NRUN would be set to 1, the IX$\phi$ and ISUM set to NDLTX divided by 2 or rounded to 4. LMASK would be set to set every nib for vector 36 in each scan line it appears (all "1" values). VTYPE would be set for VTYPE $\phi$. After processing of scan line X$\phi$, NRUN would equal zero, indicating vector 36 has now become active. NRUN would be set to 9 and VTYPE set either VTYPE 4 or 5. Since the minor and major delta values are the same, the ISUM value, when "minor" move is decremented, will always be negative, which is indicative of a major and minor move increment in the setting of each of the 10 dots for vector 36.

d. Current Band Table and Vector Ordering

Vectors for the current vector band, such as vectors 30–40 in band 28 of FIG. 3, are received from host system 12 in the form of standard vectors and initialized to the vector computations previously discussed and listed in FIG. 4. These vector values are then stored in the vector memory 24, which is a random access memory. Memory 24 represents a large table for storage of at least all the vectors for one band. The vector values for each vector are queued into the table during a queue (write) cycle and are stored in the order that the vectors are received from the host system 12. Upon commencing the processing of scan line X, et al. of the current band (scan line $X_\phi$ would be processed during initialization of vectors in the current band), the vector values for each vector would be accessed from the table in the original order received (FIFO), such access being accomplished by a dequeue (read) cycle.

In the queue cycle, a QUEUE pointer is initially set equal to a zero position in the memory table. A DQEND pointer (end of current band vectors) is set at the position in the memory table for last vector in the current band. When accessing the table in the dequeue cycle a DEQUE pointer is set equal to a zero position of the table.

In the current band vector table there will be active vectors present from the previous band processing that extend into the current band and are present in scan line $\phi$ as well as active vectors in the current band that are in scan line $\phi$ in the current band or becoming active in the current scan line being generated.

There are inactive vectors in the current band which are in scan lines not yet processed in the current band. They are merely requeued to memory without further processing.

Vectors are read out of the current band table via the DEQUE pointer and, if active, are processed into the scan line being generated, and requeued to the current band table via the QUEUE pointer if they extend into the next scan line.

Final vector ordering is achieved in high speed storing and retrieval of vectors from the current band table. Vectors in the current band can be received in any order from the host system 12 and stored in the order received. For example, in FIG. 3, vector 40 may be the first vector received from the host system in the current band 28 of vectors. The second vectors received may be vectors 30, 32 and 36. Vector 40 would be the first vector accessed from the current band table during processing of scan line, $X_1$, for example, but returned to the current band table because of its $IX\phi$ value of 8. Vectors 30, 32 and 36 would be processed for the then current scan line, X. Thus, the final ordering of vectors within vector band is not necessary by the host system 12, as this function is completed by the processor 10.

Each active vector being processed for a current scan line and remains active for one or more subsequent scan lines is requeued to the current band table in the vector memory 24 with updated vector computational values, such as, the ISUM and NRUN values being, respectively, incremented and decremented. The NIBS value is changed to the next dot position for the next or subsequent scan line to be generated. The LMASK value will rotate to its next value, which for solid lines is "on" or "1". Values for NDLTX, NDLTY and VTYPE obviously remain the same.

Thus, the vector values stored in the current band table are always the updated computational values for ISUM and NRUN. Upon accessing the vector from the table, the NIBS value is set into the raster buffer by a NIBS SET signal (to be detailed later) and the NRUN and ISUM values are again updated and the active vector is requeued to the current band table.

3. PROCESSOR ARCHITECTURE

Figure 6A:
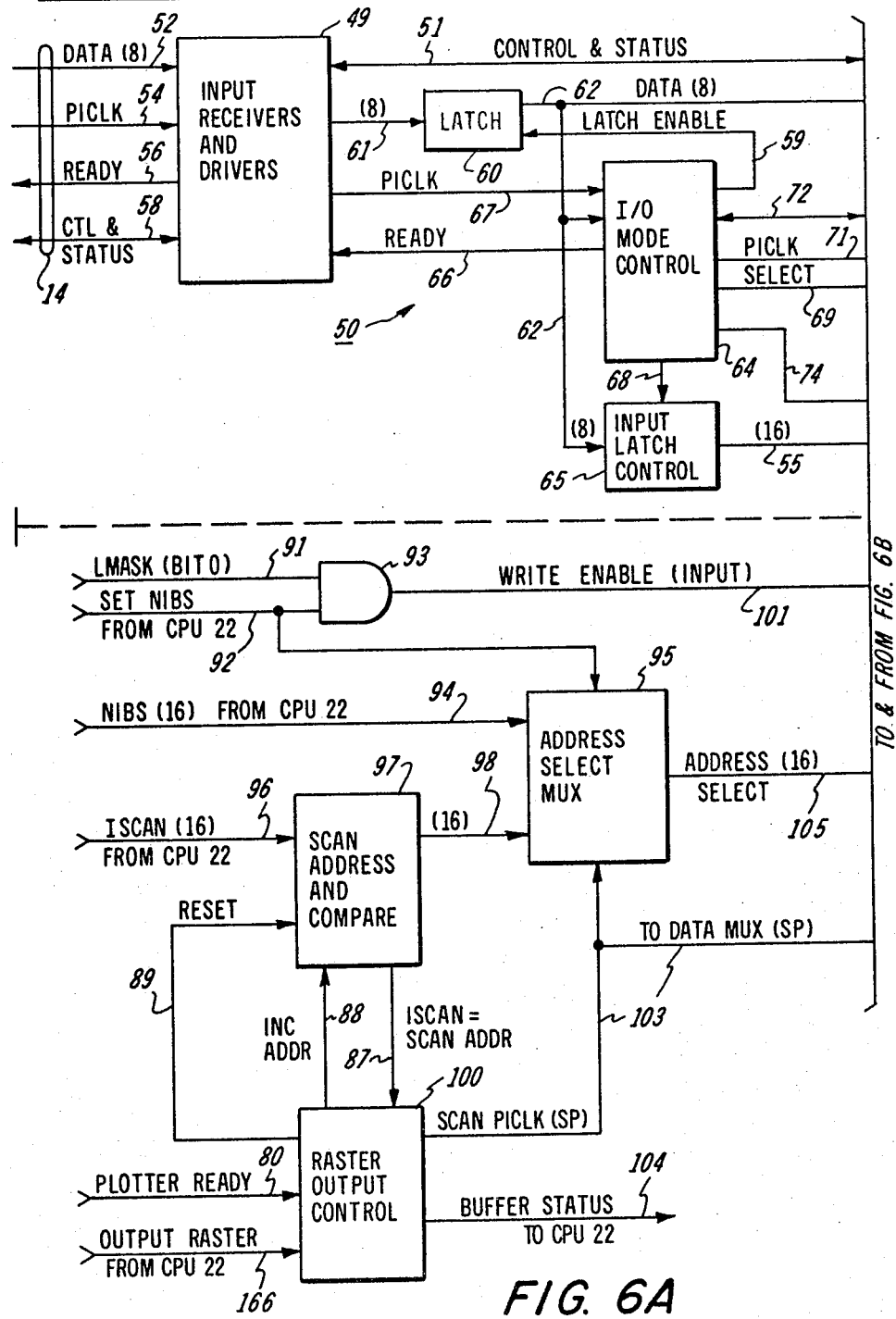
FIGS. 6A and 6B is a schematic block diagram of the I/O interface of the processor.
Figure 6B:
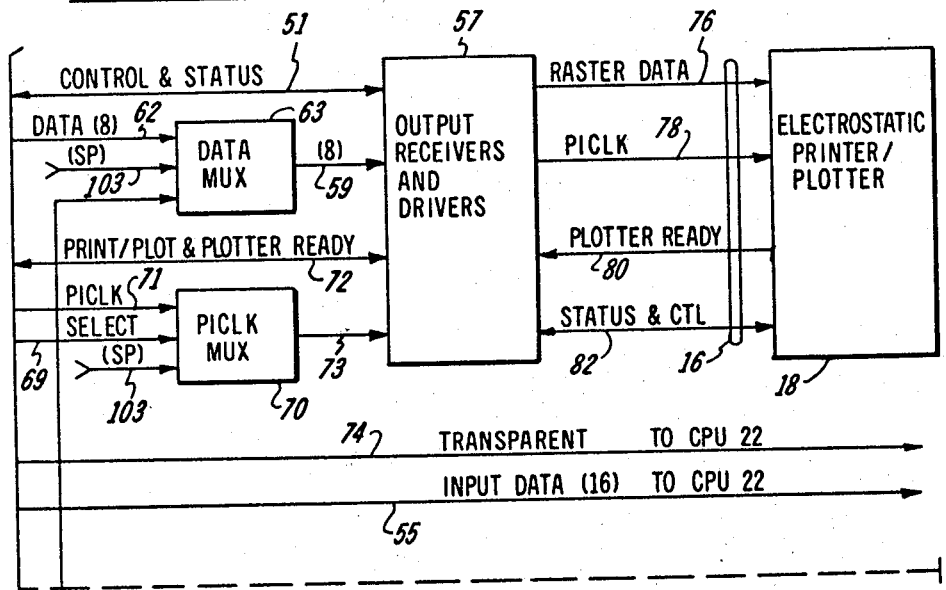
Figure 6B:
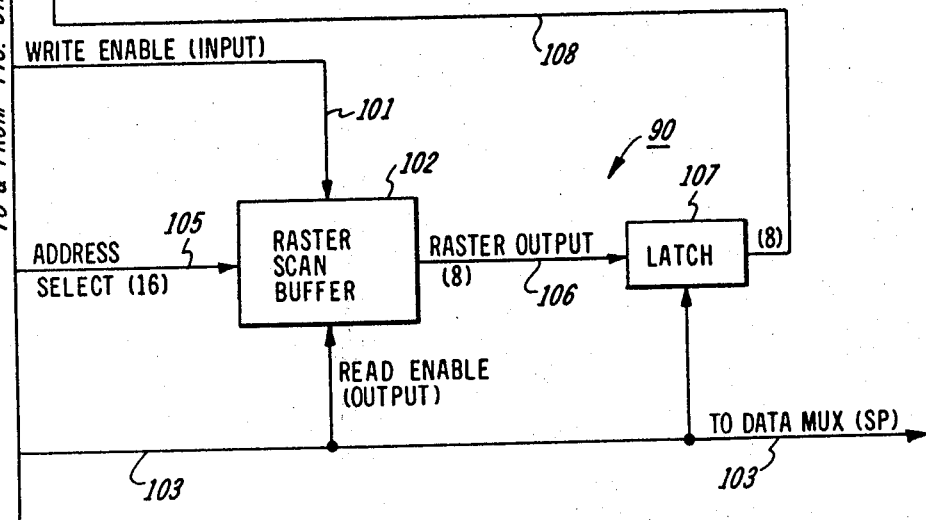

In FIG. 6, the I/O interface 20 is shown in greater detail. The I/O 20 comprises two sections, the data input and output section 50 and the nib set section 90. Vector data 14 is received at section 50 along the 8-bit data bus 52 at the TTL input receivers and drivers 49. Also received from the host system 12 is the PICLK signal, which is the parallel input clock for timing. READY line 56 provides an indication from processor 10 to the host system 12 when it is ready to receive additional data. Line 58 represents control and status communication between the processor 10 and host system 12. These lines and buses are interfaced into the I/O 20 through the input receivers and drivers 49.

I/O mode control 64 controls whether the processor 10 is in the TRANSPARENT mode or in the ACTIVE mode. In the TRANSPARENT mode, I/O acts as a repeater station and control the data through a double handshake to ensure that data is not lost during transfer. Data is being transferred through input receivers and drivers 49 to the TTL output receivers and drivers 57. The 8-bit bytes of data from the host system are placed on line 61 to latch 60 which is an 8-bit latch used in conjunction with a comparator to check whether or not the value of the byte matches that of the activate code. Also, the PICLK is received along line 67 to the I/O mode control 64. The I/O mode control 64 also has output line 59 for a LATCH ENABLE signal to latch 60. Latch 60 is enabled by I/O mode control 64 upon receipt of PICLK signal on line 67 which is interfaced through input receivers and drivers 49 to PICLK line 54.

I/O mode control 64 also provides the processor READY signal on line 66 to the host system, which is interfaced through input receivers and drivers 49 to READY line 56.

In TRANSPARENT mode, data mux (multiplexer) 63 will be operative to receive data from latch 60 along the 8-bit bus 62 and direct this data on to bus 59, interfacing the data through the output receivers and drivers 57 and on to the printer/plotter 19 via raster data bus 76. The I/O mode control 64 will also place the PICLK signal on line 71 which will be passed by the PICLK mux 70 via I/O mode control SELECT on line 69 to line 73, through the output receivers and drivers 57 to PICLK line 78. This clock signal from the host system is used to clock the data from the host system to the I/O and from the I/O to the printer/plotter in the TRANSPARENT mode.

A plotter READY signal is received from the printer/plotter 18 along line 80 to the output receivers and drivers 57 to indicate that the plotter is ready to receive additional data for printing, either from the host system 12 in the TRANSPARENT mode via the I/O mode control and READY signal lines 72, 66 and 56 or from the nib set section 90 in the ACTIVE mode via the raster output control 100.

Status and control lines 82 exist between the printer/plotter 18 and I/O 20 and are interfaced via the input and output receivers and drivers 49 and 57 via lines 51. The control and status lines 58, 51 and 82 primarily function during the TRANSPARENT mode to permit the host system to check the status of the printer/plotter 18, for example, to determine if it is on or off line or receive an indication when the printer/plotter is out of recording medium.

When in TRANSPARENT mode, the data is being examined for a special escape or activate character as it enters the latch 60. When this escape character is recognized, the I/O mode control 64 switches to the ACTIVE mode. At this time the signal on TRANSPARENT line 74 will change state enabling CPU 22 to be operative and to now receive vector data from the host system. This enablement specifically releases the CPU clocks for operation of the CPU 22.

Vector data is now received from the host system via buses 52 and 61 through latch 60 and bus 62 to the input of input latch control 65 which is enabled by line 68 from the I/O mode control 64. Latch control 65, when enabled, loads two 8-bit vector data bytes into a sixteen bit latch configuration. Once two bytes of data have been latched, further enablement will output the 16 bit data onto input data bus 55 with the latch control 65 receiving two more 8-bit bytes of vector data. The data on input data bus 55 is sent on to the CPU 22 for processing, which processing will be discussed later.

Nib set section 90 of I/O 20 handles the raster output of raster scan information received from the CPU 22 and the setting of the addresses of the raster scan bytes in a raster scan buffer 102 prior to being placed on output to the printer/plotter 18.

Two main functions are performed. The first is an input function wherein raster scan "dots" for each raster scan line are set in buffer 102. Raster scan buffer 102 is a 4096X8-bit random access memory comprising four identical groups of eight 1024-bit RAMS. The byte capacity of the raster scan buffer 102 is sufficient to accommodate the byte length for a scan line of raster data information for the widest electrostatic printer/plotter, which is presently a 72" wide nib array. The second function is an output function wherein the contents of buffer 102 is placed on raster output after completion of vector processing for each scan line. During the output function, the buffer 102 is reset to receive raster data for next scan line after all raster data has been passed out for the previous raster line.

In order to perform these functions, the instruction decode ROMS and circuits 150 of the CPU 22 will generate a SET NIBS signal on line 92 to perform the nib set function or will generate an OUTPUT RASTER signal on line 166 to perform the raster output function.

In performing the first mentioned function, the SET NIBS signal from the CPU 22 enables the address select mux 95 to switch to receive address information placed on bus 94 from the NIBS register 122.4 of the CPU 22, which will be detailed later. This address information is indicative of what nib will be "set" or energized in the printer/plotter nib array in the particular scan line of information being processed. The address on the NIBS bus 94 is a 16-bit byte wherein 13 bits are used to identify the byte number to be set in memory and the last three bits, which are the lowest order bits, are used to identify the bit in the particular memory byte that is to be set.

The SET NIBS signal is received as one of the inputs to AND gate 93. The other input of AND gate 93 connected to receive bit $\phi$ from the LMASK register 122.5 via line 91. The coincidence of these two signals on lines 91 and 92 to AND gate 93 will produce a WRITE ENABLE signal on line 101 to the raster scan buffer 102. This WRITE ENABLE signal will set the particular nib being addressed within buffer 102. If the bit $\phi$ from the LMASK register 122.5 on line 91 is always set to "1", the nib address will be set into buffer 102 upon the receipt of the SET NIBS instruction. It is to be noted that if this LMASK signal was alternately placed "on" and "off", a dotted line for a given vector would be generated, with the WRITE ENABLE signal being supplied to the buffer 102 for every other dot.

A scan address and compare circuit 97 is part of the circuitry for performing the raster output function. Circuit 97 comprises a scan byte address register which is reset to zero after all the raster data bytes for a particular scan line have been set into buffer 102. This register is incremented during the raster output. Circuit 97 also comprises a compare circuit to compare the value of the scan byte address register to the ISCAN value on line 96 which indicates the number of 8-bit bytes to be placed on output for each raster scan line. Thus, circuit 97 performs two principal functions. First, it maintains a count on the number of bytes of raster data in a scan line to be placed on output to the printer/plotter 18. Secondly, it provides an address on bus 98 to address the buffer 102 in the proper byte order for the raster scan line to be placed on output. The address register is incremented and places its address on bus 98 to the address select mux 95, one address after another after each incrementation.

When vector processing for a particular scan line has been completed and all the nibs for the scan line have been generated into buffer 102, the CPU 22 will issue an OUTPUT RASTER command on line 166 to the raster output control 100 and inactivate SET NIBS. Control 100 operates in conjunction with scan address and compare circuit 97. Raster output control 100 upon receipt of the OUTPUT RASTER command, resets on line 89 the scan byte address register and the compare circuit in scan address and compare 97. Control 100 also checks for a READY signal on line 80 from the printer/plotter 18. If the printer/plotter is ready, the first 8-bit byte in the buffer is latched into a raster data byte latch 107. The latch 107 is an 8-bit buffer and receives the data byte on raster output bus 106 upon a SCAN PICLK (SP) clock signal from control 100 on line 103. This SP clock signal is an enable for the address select mux 95, the raster scan buffer 102, and the latch 107. The data byte being addressed from circuit 97 in the buffer 102 is only active on the output raster bus 106 for the duration of the SP clock signal. Once the data byte has been held in latch 107, the output of latch 107 holds the bits for the previously data byte on bus 108 until the next SP clock signal, which is approximately 100 nanoseconds.

The SP clock signal on line 103 switches the address select mux 95 to receive address information from the address register in circuit 97 via input bus 98. The SP clock signal is also a READ ENABLE for the buffer 102, a latch enable for raster output latch 107 and a select signal to data mux 63 to output raster data on its bus 59 from input bus 108 rather than from input data bus 62. The SP clock signal is also sent to the printer/plotter 18 via PICLK mux 70 by change of state of I/O mode control SELECT on line 69, to line 73 and thence interfaced through output receivers and drivers 57 to PICLK line 78.

When the data byte and the SP clock signals are received by the printer/plotter 18, the plotter READY line 80 goes inactive. The raster output control 100 then increments the scan byte address register by one via line 88. The scan address compare circuit in circuit 97 will now compare the incremented address with the ISCAN value on bus 96. If the two do not match, i.e., if ISCAN does not equal the scan address, the sequence begins again with the raster output control 100 placing SP clock signal on line 103 to output the next 8 bit raster data byte from latch 107 and enable the buffer 102 to place another 8-bit raster data byte on bus 106. This process continues until the scan address in circuit 97 has been incremented to the value of ISCAN, the number of raster data bytes per scan line for the particular printer/plotter. At this time, the compare circuit places a signal on line 87 and the raster output control 100 changes the state on buffer status line 104 to indicate to the CPU 22 that the output of all raster data bytes for the then previous raster scan line has now been completed.

Figure 7:
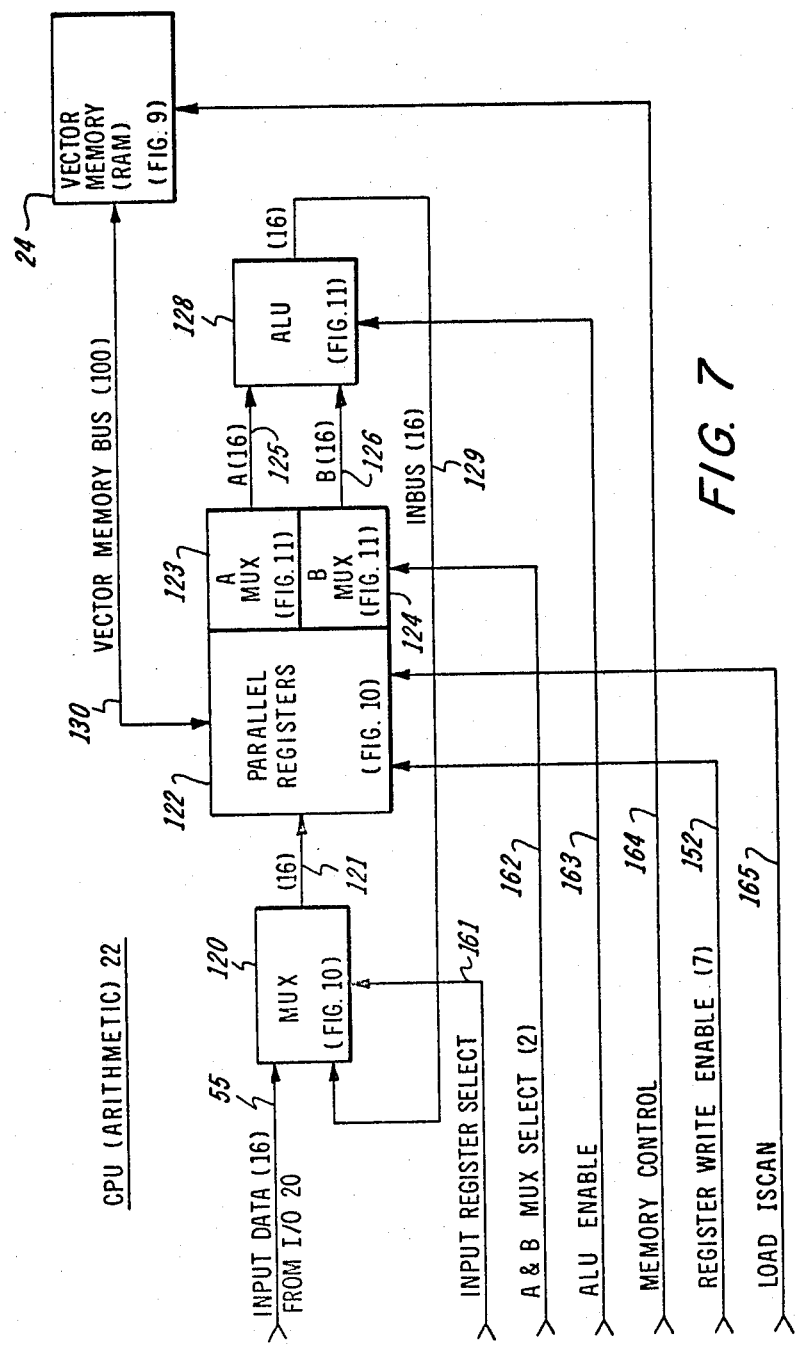
FIG. 7 is a schematic block diagram of the arithmetic segment of the CPU of the processor.
Figure 8A:
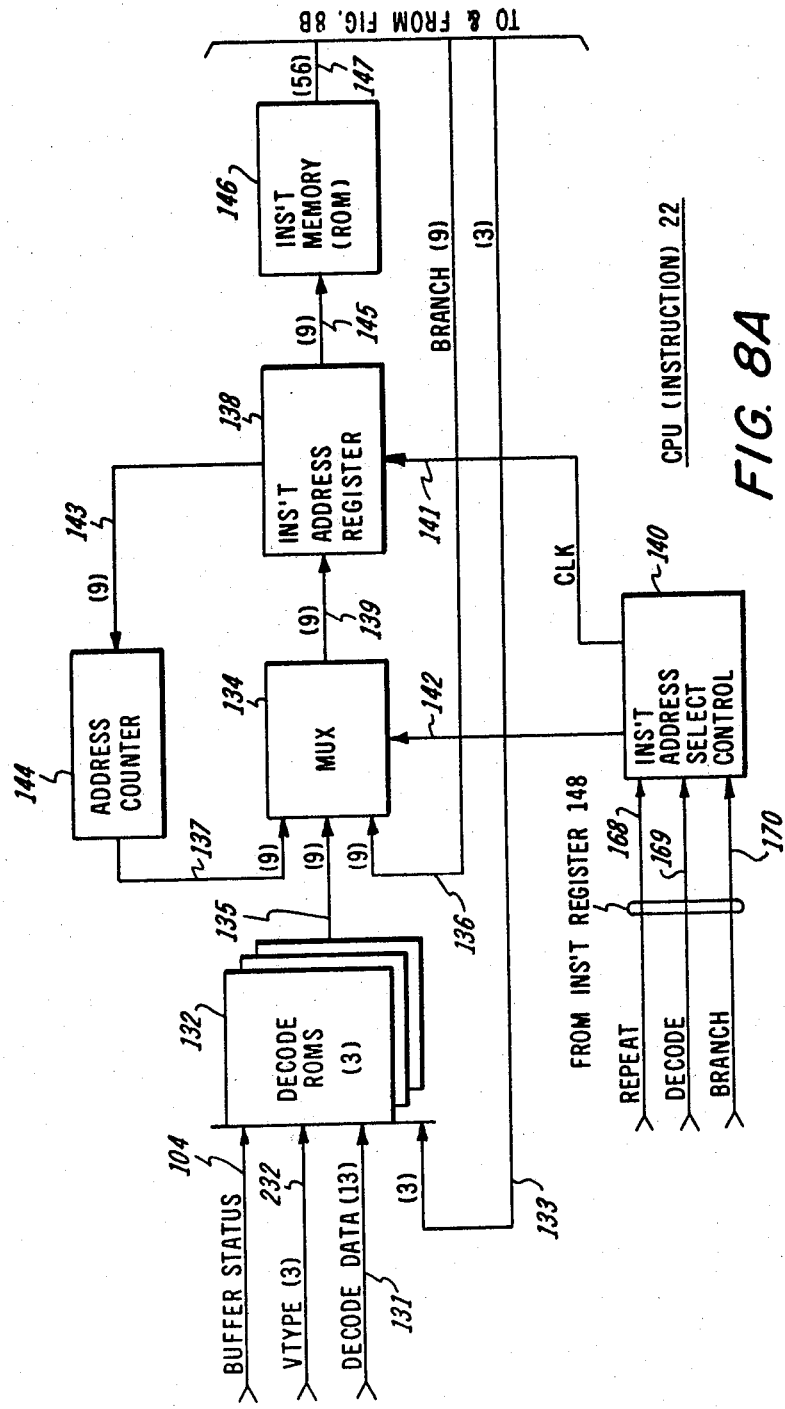
FIGS. 8A and 8B is a schematic block diagram of the instruction segment of the CPU of the processor.
Figure 8B:
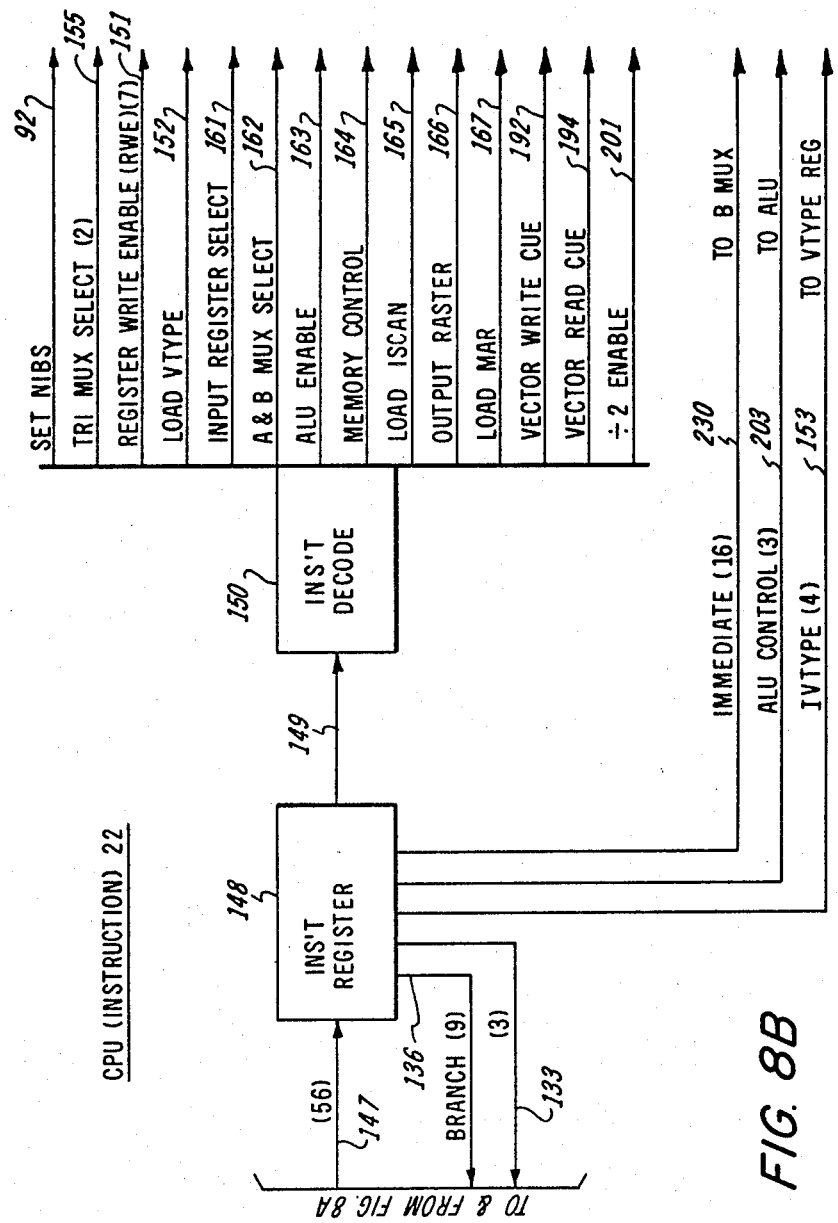

FIGS. 7 and 8 show details of the CPU 22. FIG. 7 pertains to the arithmetic segment of the CPU while FIG. 8 pertains to the instruction segment of the CPU.

When in the ACTIVE mode, vector data, placed on input data bus 55 in the 16 bit wide, two byte format, is routed to an input mux 120. Mux 120, via INPUT REGISTER SELECT on mux control line 161 from the instruction segment of the CPU, may select data from input data bus 55 or may select data from inbus 129, the inbus data being the result of an ALU function in the ALU 128.

The selected input from input mux 120 is routed on bus 121 to a plurality of parallel registers 122, which are working registers to initialize and process the computational values presenting the vector information. The output of a majority of these parallel registers 122 is routed to two multiplexers, A MUX 123 and B MUX 124. The outputs A MUX 123 and B MUX 124 are used as two 16-bit inputs to ALU 128 via busses 125 and 126 where an arithmetic function may be performed, the result of which is placed on inbus 129.

The vector memory 24 comprises a plurality of 256×1024 bit wide random access memories and configured to provide a 1024×100 bit wide RAM. Vector data is queued into and dequeued out of memory 24 via vector memory bus 130. Bus 130 is a 100 bit wide bus that is distributed to various of the parallel registers 122.

Lines 152 are register write enables for selecting one or more of the registers of the parallel registers that are to be loaded with 16-bit data from the input mux 120 on the bus 121 or loaded with 16-bit data from the vector memory 24. Line 165 is a write enable signal, LOAD ISCAN, to the ISCAN register 122.1.

A and B MUX SELECT are two sets of signals, one for A MUX 123 and the other for B MUX 124, to select one of their several inputs for routing on the respective buses 125 and 126 to ALU 138. The ALU ENABLE on line 163 enables the ALU 128 to perform the selected ALU function.

The control of the vector memory 24 is handled by MEMORY CONTROL on bus 164 to the memory. MEMORY CONTROL determines whether we are to read from or write into the vector memory and to enable the functions of loading into and reading out of the parallel registers 122.

These select, enable and control commands on lines 152 and lines 161–165 are derived out of the instruction segment of CPU 22 from the instruction register 148 as decoded by the instruction decode circuits 150 illustrated in FIG. 8.

The instruction processing for CPU 22 is shown in FIG. 8 and comprises an instruction address register 138 which controls the 9-bit address of the instruction that is to be addressed out of the instruction memory 146. Address access by register 138 is accomplished through bus 145 to the instruction memory 146. The instruction memory 146 comprises a plurality of preprogrammed read only memorys (ROMS). The particular addressed instruction selected by register 138 in the instruction memory 146 is loaded into instruction register 148 via bus 147. The instruction format on bus 147 is a 56 bit command. Portions of the 56-bit instruction command are processed through the instruction decode ROMS and circuits 150 to generate the various control, select and enable signals 92, 151, 152, 155, 161–167, 192, 194 and 201, as listed in FIG. 8.

Figure 12:
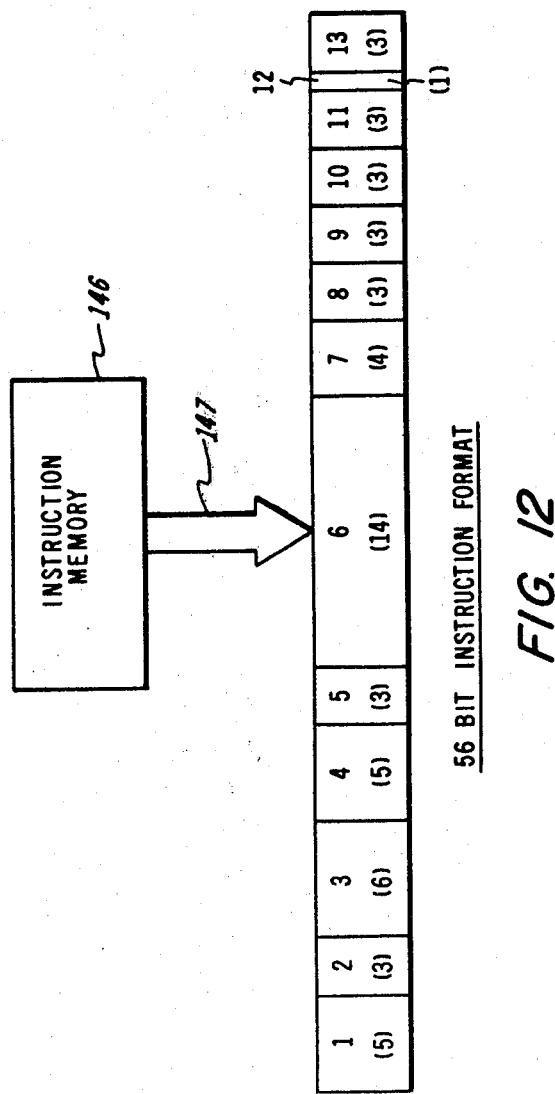
FIG. 12 is a detailed block diagram representing the fields of the instruction format for the processor.

The fields for 56 bit instruction format are shown in FIG. 12. The instruction format comprises a series of individual instructions which are simultaneously carried out. The 13 instruction fields are detailed in Table II with a brief description of their meaning and function.

TABLE II

| BITS(S) | INS'T FIELD NUMBER | MEANING |
|---|---|---|
| 00–04 | 1 | Operational Codes (Instructions) |
| 05–07 | 2 | Branch field for ALU representing two branch states |
| 08,10,11, 17,18,19 | 3 | ALU MUX 'A' input select |
| 09,12,13, 14,15 | 4 | ALU MUX 'B' input select |
| 21–23 | 5 | ALU function |
| 24–37 | 6 | ALU output select |
| 40–43 | 7 | Flag Field - Flags for operation of microcode |
| 44–46 | 8 | Vector Type (VTYPE) - FIG. 5 |
| 47–49 | 9 | Instruction Decode - Decode ROM functions to generate new branch addresses |
| 50–52 | 10 | Hold Select - Hold codes indicating a busy function |
| 53–55 | 11 | DROM Select - Decode ROM selection bits |
| 39 | 12 | Extension |
| 16,20,38 | 13 | Spares |

Field 1 relates to various processor operation codes, such as, those listed in FIG. 8 at lines 92, 151, 152, 155, 161–167, 192, 194 and 201. Field 2 represents branch codes for two different branch states. Fields 3 and 4 are the codes for selection of the desired input of the A MUX 123 and B MUX 124. Field 5 are the ALU function codes, such as, addition or subtraction or OR ing the inputs on buses 125 and 126. Field 6 is the selection codes for the various parallel registers 122 to receive the output from ALU 128. These are the REGISTER WRITE ENABLE (RWE) commands on lines 151. Field 7 are codes for flags used in processing. For example, flags are used for setting special flip-flops to be tested by the operational codes. A flag is used to indicate that the "top of memory" condition in vector memory 24 has been exceeded. Field 8 relates to the codes to identify the vector types explained in FIG. 5. Field 9 relates to codes out of the instruction register 148 along bus 133 to function at the decode ROMS 132 to generate new branch addresses. Field 10 are bits used to identify HOLD ON TRANSPARENT when the I/O 20 is operating in the TRANSPARENT mode, HOLD ON BUSY for indication to the host system 12 that the CPU 22 is processing and cannot receive any further vector data at this point in time, and HOLD ON RASTER indicating that the OUTPUT RASTER command has been given to the I/O 20, holding off further vector to raster processing until that function is complete. Field 11 are operational codes used to select which one of the three decode ROMs 132 is to be selected for generating an address for the instruction address register 138. Field 12 consists of one bit in the format for extending the functions of Fields 7 through 11. If this bit is "$\phi$", then these fields perform ALU branch functions; otherwise, these fields will perform the functions just mentioned. Field 13 are three spare bits that do not presently perform a function.

The 56 bit instruction format provides high speed access of the vector memory 24 and provides the parallel processing of vector to raster conversion where various vector to raster functions are performed simultaneously, greatly reducing the time required to convert the original coordinate information into raster data information for each scan line.

Referring again to FIG. 8, the instruction address select control 140 controls the input selection of instruction address mux 134 and the enablement of the instruction address register 138. Three inputs are provided to control 140. These inputs represent instructions developed from the instruction presently being executed and are derived from instruction register 148. These inputs, REPEAT, DECODE and BRANCH, represent instruction address selections when the instruction address in the address register 138 is not to be incremented to next immediate instruction address in the microcode. The first input is REPEAT on line 168 which commands that the previous instruction be repeated. The DECODE instruction on line 169 and the BRANCH instruction on line 170 are used for selecting the respective inputs on buses 135 and 136 to the instruction address mux 134, with selection made via control line 142.

Mux 134 can select one of three 9-bit inputs, the branch input from the instruction register 148 on bus 136, the decode input from the decode ROMs 132 on bus 135, or the incremented address input from the address counter 144 on bus 137. Counter 144 receives the previous instruction address register 138 on bus 143 and increments this address by one to the next sequential instruction address in the microcode.

The address select control 140 operates as follows. If no input is received on lines 168, 169 or 170, the control 140 via line 142 enables the input on bus 137 from address counter 144, meaning that the next instruction address to be formed by address register is the next sequential address in the microcode. This next address is clocked into the register 138 by the address select control clock signal on line 141 to the register 138. If the instruction command to the control 140 is REPEAT on line 168, there will be no input selected by the mux 134 so that the previously generated instruction in the register 138 will be used to address the instruction memory 146 by a clock enablement signal on line 141. If the instruction command to the control 140 is DECODE on line 169, the control 140 will select via line 142 the input on bus 135 from the decode ROMS 132 and a control clock signal on line 141 will clock this new address into the register 138. If the instruction command to the control 140 is BRANCH on line 170, the control 140 will select via line 142 the input on the bus 136 from the instruction register 148, which is a branch address to another section of the microcode. An enablement signal on line 141 will clock this new address into the register 138.

There are actually 3 decode ROMS 132. The inputs to the decode ROMS 132 represent a number of variables, one part of which is from the present instruction itself via bus 133, another part of which is the vector type, VTYPE, on bus 232. A still further part is BUFFER STATUS on line 104 from I/O 20 and the last part represents various decode data inputs on lines 131. These various input conditions are used to determine and generate an address within the decode ROMS 132 for the next instruction address provided on bus 135 to the instruction address register as input selected by the instruction address mux 134.

Thus, these variable conditions at input of the decode ROMS 132 are used to develop an instruction address to be executed when these conditions are occurring in a particular combination as represented by the inputs. The function is similar to a branch type of instruction. Given various initial conditions occurring at the I/O 20 and in the CPU processing functions, an instruction is derived based upon that particular combination of conditions, and the decode ROMS 132 derive an address as to where an instruction "branch" is to be made in the microcode.

As previously indicated, the instruction address selected by mux 134 is loaded into the instruction address register 138 via bus 139. The addressed 56 bit instruction is then loaded out of the instruction memory 145 into the instruction register 148. A portion of this instruction is forwarded via bus 149 for decode and distribution by decode circuits 150 for initiating the various instruction functions identified in FIG. 8. The other portion of the instruction is broken out immediately as an input on a 16-bit bus 230, termed IMMEDIATE, and is one of the four inputs to the B MUX 124. There is also a 3-bit input via bus 203 to the ALU 128 to control ALU operations and a 4-bit input via bus 153 to the VTYPE register 122.9.

Figure 9:
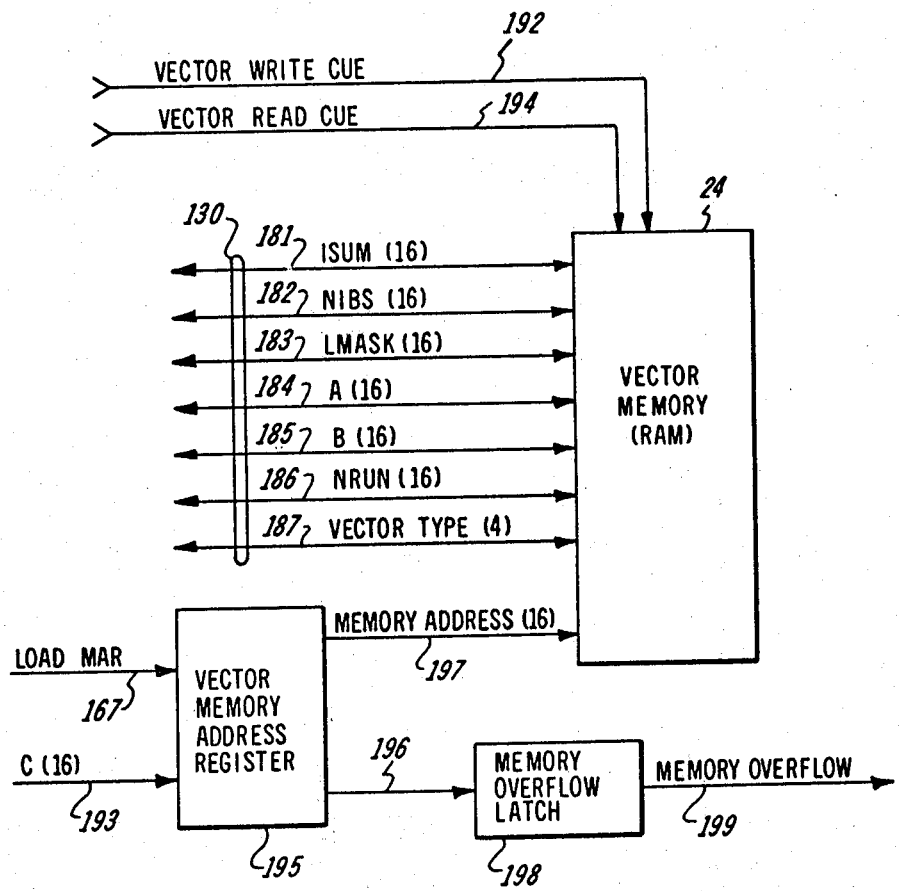
FIG. 9 is a schematic block diagram of the vector memory segment of the processor.

FIG. 9 shows in greater detail the vector memory 24. Besides the 1024×100 bit wide RAM memory 24, there is also the vector memory address register 195 which comprises a plurality of D type flip-flops for storing the 16-bit address supplied by the C register 122.2 in the CPU 22 via the 16-bit bus 193 which will be described in greater detail later. A new address is loaded into the register 195 each time a LOAD MAR command is clocked from the CPU 22. The LOAD MAR command is received on line 167 from the decode instruction output of the instruction decode circuits 150. The loaded address generates a memory address from the register 195 which is placed on memory address bus 197 to the vector memory 24. This address specifies the particular place in memory into which the vector data is to be written upon receipt of a VECTOR WRITE CUE on line 192 or the particular place in memory out of which the vector data is to be read upon receipt of a VECTOR READ CUE on line 194. The WRITE CUE causes the parallel registers 122 in the CPU 22 to place their contents simultaneously on bus 130 into memory 24 at the address designated from the address register 195 while the READ CUE causes the contents stored at a particular location in the memory 24 to be placed simultaneously on bus 130 to the parallel registers 122.

Figure 10A:
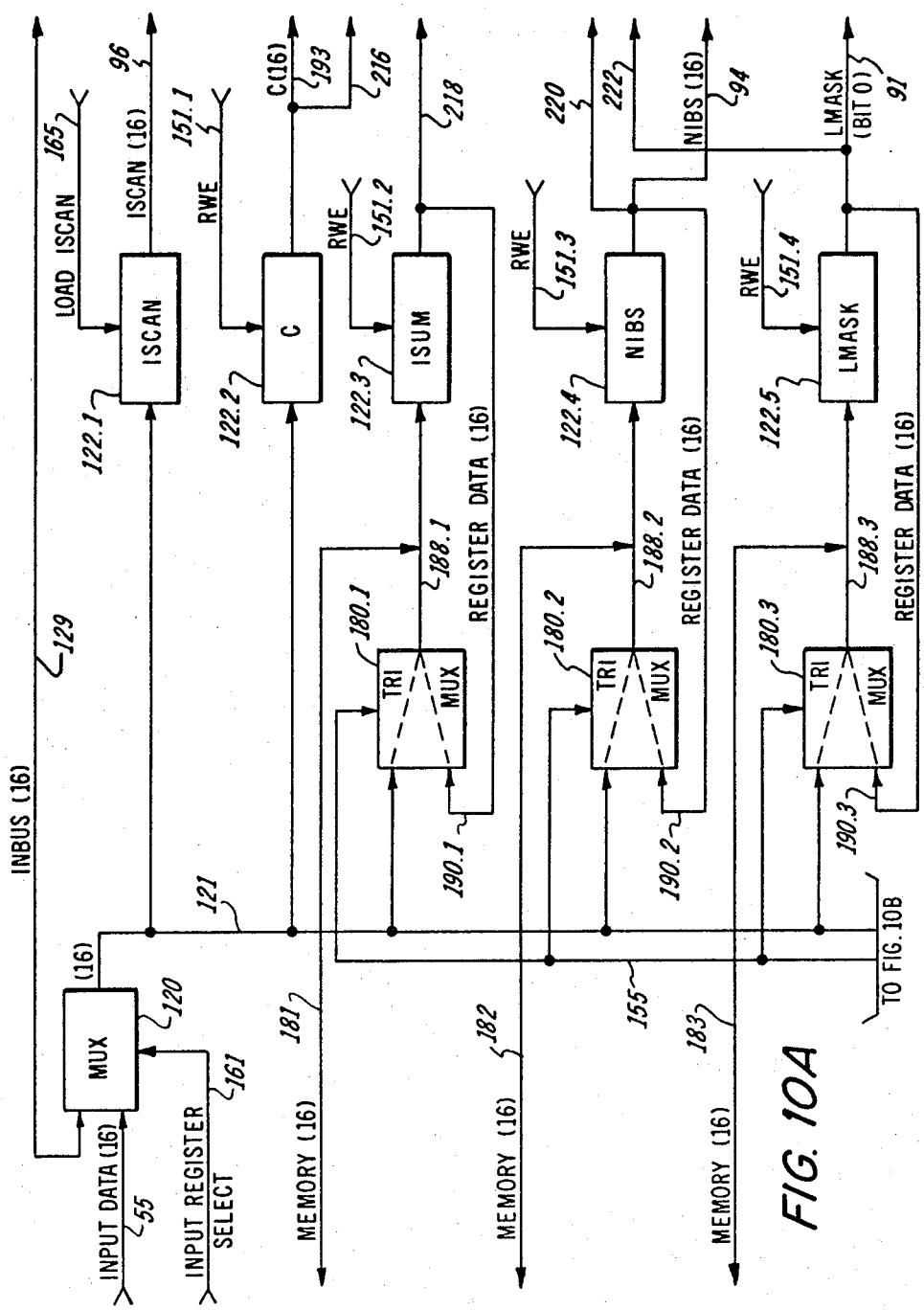
FIGS. 10A and 10B is a detailed schematic block diagram of a portion of the arithmetic segment of the CPU.
Figure 10B:
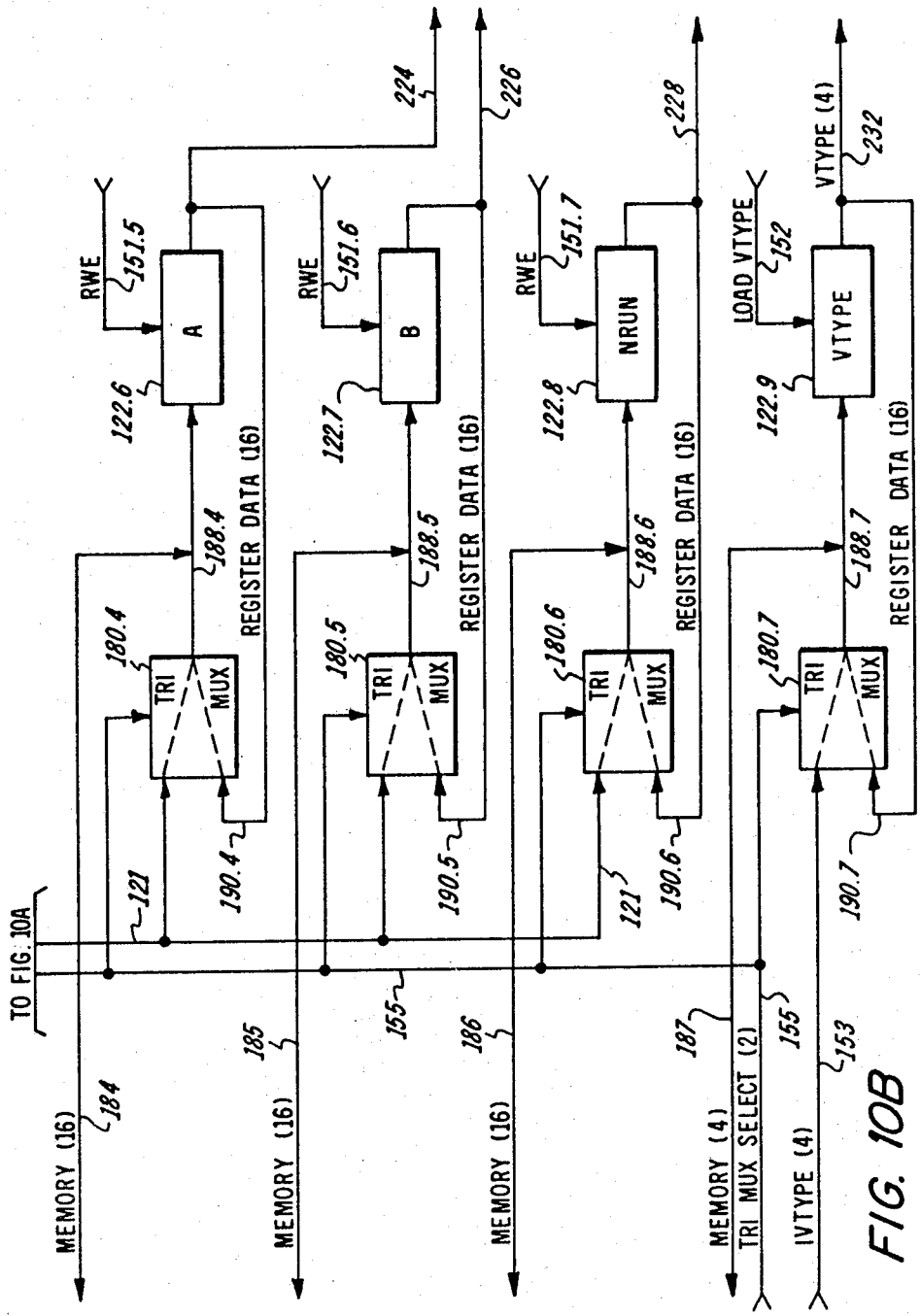

Bus 130 comprises six 16-bit subbuses 181–186 and one 4-bit subbus 187. Subbus 181 is for the ISUM value of the vector computations. Subbus 182 is for the NIBS value. Subbus 183 is for the LMASK value. Subbus 184 is for the A register values including the NDLTY value. Subbus 185 is for the B register value which is the NDLTX value. Subbus 186 is for the NRUN value. Subbus 187 is for the VTYPE value. As shown in FIG. 10, subbus 181 is connected to the input of the ISUM register 122.3. Subbus 182 is connected to the input of the NIBS register 122.4. Subbus 183 is connected to the input of the LMASK register 122.5. Subbus 184 is connected to the input of the A register 122.6. Subbus 185 is connected to the input of the B register 122.7. Subbus 186 is connected to the input of the NRUN register 122.8. Subbus 187 is connected to the input of the VTYPE register 122.9. The function of these parallel registers will be detailed later.

Referring again to FIG. 9, the vector memory address register 195 also includes a memory overflow circuit (not shown) which monitors the memory address bus 197 to determine when the last available address is being employed (vector queued) in the vector memory 24 at which time a signal is issued from the register 195 on line 196 to set the memory overflow latch 198. Latch 198 is a flip-flop which is set by this signal to produce the MEMORY OVERFLOW command on line 199. This command, which acts as a flag, forms an input condition to the Decode ROMS 132 in generating the next instruction, which instruction will terminate the further reading into the vector memory 24 any additional vector data bytes from the host system 12.

Figure 11:
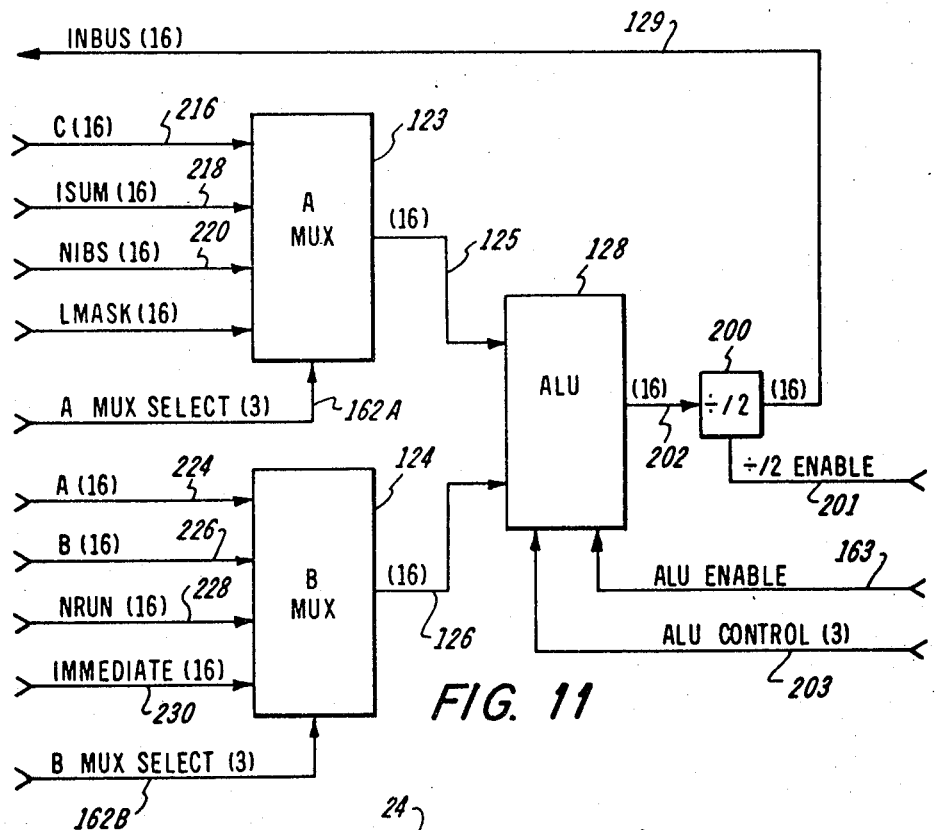
FIG. 11 is a detailed schematic block diagram of another portion of the arithmetic segment of the CPU.

FIGS. 10 and 11 provide a more detailed disclosure of the arithmetic segment of the CPU 22 shown in FIG. 7. In FIG. 10, the arrangement of the parallel registers 122 is shown in detail.

In FIG. 10, the input mux 120 selects via INPUT REGISTER SELECT on line 161 either input from the input databus 55 or from the inbus 129 from the ALU 128. The selected input is placed on bus 121 which, in turn, is an input to the ISCAN register 122.1, the C register 122.2, and the other registers 122.3–122.8 via their respective tri muxes 180.1–180.6, except for the VTYPE register 122.9. Each of the tri muxes 180.1–180.7 have two possible inputs, the data on bus 121 or the wrap around output from the registers 122.3–122.9 via register data bus 190.1–190.7. The outputs from the tri muxes 180.1–180.7 is respectively provided on buses 188.1–188.7 which may direct the output to the respective registers 122.3–122.8 if the register has been enabled by RWE on lines 151.1–151.7 or by LOAD VTYPE enable on line 152 for VTYPE register 122.9.

The tri muxes 180.1–180.7 are operative by a two bit signal, TRI MUX SELECT on line 155 from the instruction decode circuit 150. The tri muxes 180 have three states requiring a two bit code for state selection. These muxes may be selected to take input from bus 121 or they may be selected to take input from the register data bus 190 or they may be provided with a high impedence level at their outputs so that essentially their connection to bus 188 is an open circuit.

Using this configuration of three states in conjunction with the INPUT REGISTER SELECT of mux 120 and the enable signal, RWE on lines 151 to each of the parallel input registers 122 having an input tri mux 180, vector data can be routed four different ways:

1. From the input data bus 55 to the enabled parallel registers 122 for initialization of vectors.
2. From the ALU 128 via inbus 129 to the enabled parallel registers 122 for further vector computation.
3. From the disenabled parallel registers 122 to the vector memory 24 via the tri muxes 180 for initial queuing or requeuing of vector computations during the memory write cycle.
4. From the vector memory 24 to the enabled parallel registers 122 with tri muxes 180 in their high impedance state (open circuit to buses 188) during the memory read cycle.

The ISCAN register 122.1, containing the plotter raster scan length byte count value, and the C register 122.2, performing certain special vector controls and vector memory controls, do not require any multiplexing functions. The ISCAN register 122.1 is loaded from initialize plot control vector with an instruction command, LOAD ISCAN, on line 165. This register places and maintains on its output line 96 to the scan address and compare circuit 97, the ISCAN value (the number of bytes for each raster scan line) during the vector to raster processing for the entire plot.

C register 122.2 has bus 121 as an input and when enabled by RWE on line 151.1, provides one of the inputs on bus 216 to the A MUX 123 via A MUX SELECT 162a (FIG. 11) and also, as previously explained, the address input on bus 193 to the vector memory address register 195 when enabled by the LOAD MAR signal on line 167. Thus, this output of the C register 122.2 is used to address into the vector memory 24 and is not necessary for the memory storage and retrieval.

The parallel input registers 122.3–122.8 hold values of vector computations but some of these registers as well as C register 122.2 perform other functions that will be explained at this time.

A register 122.6 is an $4 \times 16$ bit stack register, $A\phi$–$A3$, for performing various computational operations. C register 122.2 is an $8 \times 16$ bit stack register, $C\phi$–$C7$.

The output of A register 122.6 is to the register data bus 190.4 or to the B MUX 14 via bus 224.

Under A register 122.6, $A\phi$ is used as a scratch pad and during vector to raster conversion holds the NDLTY value of the vector under process.

A1 contains the DQEND address which is the address of the last vector in the current band table of the vector memory 24 and represents the end address during the dequeue cycle when vector computations are being read out of the memory 24.

A2 contains the NMASK value, which is essentially the next LMASK value when the next new vector comes in from the host system during vector initialization. For example, if NMASK is set to a value for processing a dashed line vector, LMASK will be initialized to this value for the next incoming vector to be a dash vector. The NMASK value is only for the next vector and subsequent vectors will be processed according to the previous LMASK value.

A3 contains the INQUE address of the last vector in the next band table of the vector memory 24 counting down from the top of memory.

B register 122.7, a $1 \times 16$ register, is used as a scratch pad and during vector to raster conversion holds the NDLTX value of the vector under process. The output of B register 122.7 is to the register data bus 190.5 or to the B mux 124 via bus 226.

Under the C register 122.2, Cφ is used as a scratch pad.

C1 contains the QUEUE address for the vectors in the current band table that were initialized and stored in the memory 24 and may be requeued again to the memory 24 during the queue cycle in vector to raster processing of the current band.

C2 contains the DEQUE address for the vectors in the current band table that are to be read out of memory during the dequeue cycle in vector to raster processing of the current band.

C3 contains BYTCNT, i.e, the byte count divided by two of the number of byte pairs to be read from the host system 12 before returning to the TRANSPARENT mode.

C4 contains the NSCAN value, i.e., the number of scan lines in each of the vector bands comprising the plot.

C5 contains a variable termed, KSCAN, which is the number of the current scan lines within the current band that is being actively processed. This value is reset to zero at the beginning of current vector band processing and is incremented until KSCAN equals NSCAN when processing of the next band is commenced.

C6 contains the 'KNT' or count for the number of EOB sequences that are to be processed before processing of new vectors to be received from the host system 12.

C7 contains the value, DMASK, which is what will essentially be the next LMASK value for each of the succeeding new vectors coming in from the host system during vector initialization. For example, if DMASK is set to a DMASK value for processing a dashed line vector, LMASK will be initialized to this value for all subsequent incoming vectors to be a dash line vector.

The NRUN register 122.8 is a 16 bit binary down counter and contains the NRUN value, i.e., the number of nibs (dots) that have to be set for a particular vector. The output of this register is to the register data bus 190.6 or to the B MUX 124 via bus 228.

The NIBS register 122.4 is a programmable 16-bit binary up-down counter and contains the NIBS value, i.e., which is the address of the nib byte we want to set in the raster memory buffer 102 during the vector to raster conversion. 13 bits in each byte from this register determine which byte in a raster scan will be addressed and the other 3 bits determine which bit within the selected byte will be addressed. The output of this register is to the data register bus 190.2 or on bus 94 to the address select mux 95 in I/O 20 (FIG. 6) for the nib byte address during SET NIBS processing, which processing occurs during vector to raster processing. Also the output from NIBS register 122.4 may be selected as an input to the A MUX 123 via bus 220 or placed on the register data bus 190.2.

The ISUM register 122.3, is a 1×16 bit slope approximation register holding the values for ALU computation determative of vector slope approximation as previously explained in detail relative to Table I. The output of this register is to the register data bus 190.1 or to the A MUX 123 via bus 218.

The LMASK register 122.5 is a 1×16 bit register with rotate left capability. The contents of the LMASK register can be rotated to the left so that the least significant bit can be employed via output line 92 to determine the sequence of the SET NIBS command 92 for each vector under process. The 16 bit output of this register is also to the register data bus 190.3 or to the A MUX 123 via bus 222.

The LMASK register directs the generation of solid, dashed or dotted lines. When all bits of the register are set, a solid line for a vector will be generated through the vector band. With combinations, for example, four bits set and four bits not set, etc., a dashed line can be generated. If every other bit position is only set, a dotted line can be formed.

The LMASK function is not essential to vector to raster conversion but it is quite important from the standpoint of eliminating the generation of vectors for each dash or dot comprising a dashed or dotted line.

The VTYPE register 122.9 is used to store the vector type code and its output is to the register data bus 190.7 or on bus 232 to form part of the input to the decode ROMS 132 to enable different types of branching instructions depending on the particular vector type being processed.

Referring now to FIG. 11, A MUX 123 and B MUX 124 are multiplexers capable of selecting one of four sets of sixteen lines for input to the ALU 128. Selection is accomplished by A MUX SELECT via lines 162a and 162b. The 3 bit coding provides for selection of the desired input and enablement of the mux. The coding also can require the outputs of A MUX 123 or B MUX 124 to be either or both zero for certain ALU functions. Thus, these muxes are 5 input selectors.

The inputs 216, 218, 220, 224, 226 and 228 to the A MUX 123 and B MUX 124 have just been identified relative to their corresponding registers 122. The IMMEDIATE input on bus 230 is directly from the instruction register 148. The IMMEDIATE value on the 16 bit bus 230 is essentially a portion of the instruction from the instruction register 148 being produced in fields 7 through 12 of the 56 bit instruction format (FIG. 12) when the extension bit 12 is low or "0". The IMMEDIATE value is provided to the ALU 128 input via B MUX 142 to assist in an arithmetic function at the ALU. Rather than use a parallel register 122 to help carry all figures for arithmetic ALU functions, the instruction register 148 can provide arithmetic values directly to the ALU, with the arithmetic result directed on inbus 129 to the proper parallel register 122.

As previously mentioned, the output of A MUX 123 is one input to the ALU 128 via bus 125 and the output of B MUX 124 is the other input to the ALU 128 via bus 126. ALU 128 is activated and enabled through a command, ALU ENABLE, from the instruction decode circuits 150 on line 163. The actual function to be performed by the ALU 128 is controlled by a 3 bit code, termed ALU CONTROL on lines 203 from the instruction register 148.

The output of the ALU 128 is passed on bus 202 to a divide by two shift register 200 used to shift the binary data by one bit to the right, which is equivalent to decimal division by two. The shift register 200 may be enabled by ÷/2 ENABLE command on line 201 from the instruction decode circuits 150 to perform the division. When not so enabled, the data on bus 202 is passed directly to inbus 129 on to control mux 120 wherein the ALU result may be supplied to one or more parallel registers 122.

Figure 13:
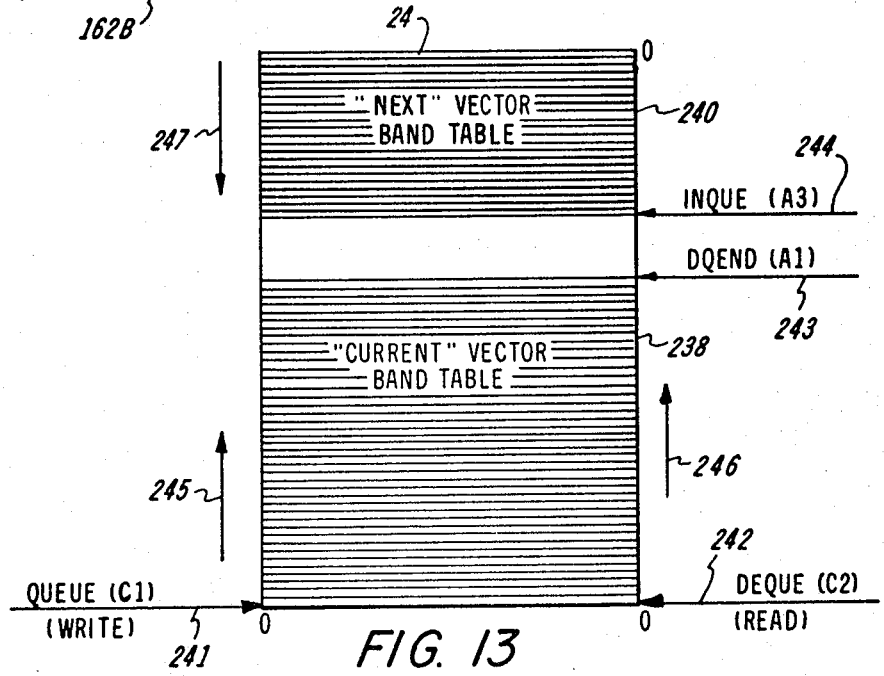
FIG. 13 is a conceptional illustration of the employment of the vector memory shown in FIG. 9.

The conceptual architecture for the vector memory 24 is shown in FIG. 13. Memory 24 can be visualized as a large table having many slots. The computation values for each vector are placed in each respective slot.

"Pointers" are used to direct or access the vector values to and from the table.

The vector memory table may be divided into two parts, the "Current" vector band table 238 and the "next" vector band table 140.

The current vector band table 238 will include both active and inactive vector values for the current vector band being processed to the raster scan. By "active", it is meant that the vector values are in process when accessed from memory for the current scan line. By "inactive", it is meant that the vector values are not yet in process when accessed from memory for the current scan line because their beginning coordinates or their IX$\phi$ values are for subsequent scan lines in the current band yet to be processed. The next vector band table 240 contains inactive vector values for the next succeeding vector band. During idle times, for example, during raster scan line output, the processor 10 can receive vector data 14 for the next vector band, initialize the vectors for their computational values and store them in the next band vector table 240 until this next band becomes active, i.e., becomes the new current vector band.

The current band vector table 240 has three pointers. A QUEUE (write) pointer 241 whose address is carried in C1 of register 122.2, a DEQUE (read) pointer 242 whose address is carried in C2 of register 122.2 and a DQEND pointer 243 whose address is carried in A1 of register 122.6.

The QUEUE pointer 241 indicates during the queue cycle the next available location in which the computational values of a vector may be written into the table 238. The DEQUE pointer 242 indicates during the dequeue cycle the next location in which the computational values of a vector are to be read from the table 238. The DQEND pointer 243 points the position in table 238 wherein the computational values for the last vector of the current vector band are stored.

As shown in FIG. 13, the QUEUE pointer is incremented from zero during a dequeue cycle in the direction of arrow 245. The DEQUE pointer 242 is incremented from the zero position of the table 238 during a dequeue cycle in the direction of arrow 246 until DEQUE equals DQEND.

If the current band sizes permits, the upper portion of the vector memory 24 is used to store the computational values for vectors in the next vector band. The INQUE pointer 244 whose address is in A3 of A register 122.6 indicates the next possible location for storage of the computation values for an incoming next band vector. The INQUE pointer 244 starts from the top of memory, the zero position of table 240 for input of vectors for the next band, and is incremented downward in the direction of arrow 247. The CPU 22 insures that the position of the INQUE pointer 244 does not exceed the position of the DQEND pointer 243 of the current band.

A brief description is now given as to the operation of tables 238 and 240. The functioning of these tables parallels the description of the processor operation to be next described relative to processing flowcharts and timing diagrams.

There are two states of current band table operation relative to processing vectors. The first state involves vector input, initialize, vector to raster process and a queue cycle. The second state involves a dequeue cycle, vector to raster processing and a queue (requeue) cycle. In the first process state, all vectors for the current band are achieved by the CPU, initialized and then queued into the current band table 238. During this initialization, vectors active in scan line X$\phi$ are processed and queued with appropriate nib bytes set in the raster scan buffer 102. All other vectors at this point in time are inactive and are merely initialized and queued into table 238 with the QUEUE pointer 241 being incremented upon the storage of each vector.

When an end of band condition (EOB) is received, scan line X$\phi$ is placed on output from buffer 102. During this time, vectors falling in the next band can be received from the host system 12, initialized and placed in the next band table 240, with the INQUE pointer 244 being incremented from its top of memory zero position upon the storage of each next band vector.

After raster scan output for the previously processed scan line is completed, the second state is commenced. The DQEND pointer is set equal to the last queue entry and the QUEUE and DEQUE pointers are set to their zero positions. Vectors are read out of the table 238 and vector to raster processed. If the vector is still active, they are requeued to table 238 with QUEUE pointer 241 incremented as the vectors are sequentially stored.

After dequeue of the entire table of current band vectors, the processing of a scan line has been completed and the raster output of that line is initiated.

During this raster output, more vectors in the next band can be received from the host system, initialized and stored in decending order in the next band table 240 starting from the last addressed position of the INQUE pointer 244.

Vector processing during raster output time is not possible because the raster scan buffer 102 is in use during this cycle.

Prior to and during the input of new vectors for next band, the INQUE pointer 244 is compared with the DEQUE pointer to insure that the next band table 240 does not exceed and overflow into the current band table 238. If INQUE equals DQEND, the input of the next band vectors is suspended.

During the raster output cycle, the DQEND pointer 243 is set to the new upper end position for the current band. As the scan lines for the current vector band are processed, the table 238 will shuffle downward as vectors end in scan lines processed in the current band. Note that on completion of all scan lines $X_{NSCAN-1}$ for the current band, vectors continuing from one vector band into the next succeeding vector band remain in the current band table 238. The QUEUE pointer 241 will be at an addressed position in table 238 immediately succeeding the last of such band extended vectors.

Upon commencing the vector to raster processing of the first scan line, X$\phi$, of the next band, three different functions must be performed relative to the tables 238 and 240 in FIG. 13. First, the QUEUE pointer 241 and the DEQUE pointer 242 are set to their zero positions. A dequeue cycle is commenced wherein vectors in what was the previous band ane extend over to the new current band are accessed out of table 238, processed for active vectors appearing in scan line, X$\phi$, and requeued via the QUEUE pointer 241 back into table 238. Requeuing starts from the bottom of the table 238.

Secondly, when the DEQUE is equal to the DQEND, then the processor, recognizing that the previous current band has been completed, causes the DQEND pointer 243 to be set to the address at the top of memory or the zero position of the next band table 240 and the DEQUE pointer 242 set to the address of the INQUE pointer 244. The dequeue cycle is continued with vectors being read out of the next band table 240 starting from the last INQUE address, processed and requeued via the QUEUE pointer 241 into the table 238 if they are still active. The requeuing of these vectors places them in what is now the new current band table 238. This dequeue cycle ends with the DEQUE pointer 242 at the address of DQEND at the top of memory. The DEQUE pointer 242 is then set to zero at the bottom of memory and the DQEND pointer is set to the last address of the QUEUE pointer 241. The foregoing assumes that all vectors starting in the next band have been received, initialized and queue into the next band table 240.

Third, if, in fact, all the vectors for the next band have not been previously queued into table 240, the remaining vectors will now be received from the host system 12 and initialized and processed for scan line $X_{100}$ of the new current band and queued into the table 238. When completed, the DQEND pointer 243 is set equal to the last address of the QUEUE pointer 241 and the INQUE pointer is set to zero at the top of memory, ready to receive vectors for new next vector band.

From all the foregoing description, it should become evident that an important feature of the present invention is the parallel processing architecture of the processor 10. In one single instruction cycle, a single vector can be properly processed for setting a nib(s) in a raster scan line undergoing vector to raster conversion. During vector initialization, the vector VTYPE is set up ahead of time. When the particular vector becomes active, the VTYPE value is used to branch in the microcode of the processor 10 to a vector to raster routine designed specifically for processing this particular vector. A single instruction will process the vector for the current scan line being processed and setting the nib address in the raster scan buffer 102 and requeue the vector to memory 24 if still active in the current band. This single instruction approach and the simultaneous but independent parallel processing of the computational values of the vector provide a vector to raster processor of very high speed capabilities, not previously realized. The following vector to raster instruction is given as an example of this capability.

The vector has been initialized to its computational values and the VTYPE has been determined as VTYPE #1, i.e., the vector has a +Y MAJOR movement and a +X MINOR movement. During the dequeue cycle the vector is read from the current vector table 238 via DEQUE pointer 242 and, at the same time, the VTYPE is decoded via input 232 to decode ROMS 132. This results in a branch to instruction 810 in the microcode under V/R processing with VTYPE=001 (code).

Instruction 810 is as follows:

810: SET NIB; ROT LMASK; INC NIB; DEC NRUN; ISUM=ISUM−Bφ; REPEAT; BN ALU To ISUM=ISUM+Aφ; BR To 92φ; BN NRUN To 9φφ

These functions are accomplished simultaneously.

1. SET NIB—A bit will be set via bus 94 into the raster scan buffer 102 whose address is in the NIBS register 122.4. The bit is set (via lines 91 and 92) if the lowest significant bit position in the LMASK register 122.5 is "1". If "0", the nib will not be set indicating that the vector is a special line, either a dotted or dashed line.

2. ROT LMASK—The LMASK register 122.5 is shifted left one bit position which is LMASK φ bit position for what is going to be done when the vector is processed for the next scan line.

3. INC NIB—The NIBS register 122.4 is incremented. Since there is a +Y MAJOR move involved, there will always be incremention of one in the +Y direction for each succeeding scan line.

4. DEC NRUN—The NRUN register 122.8 is used as a down counter and since a nib has been set, its count, the total number of nibs to be set, is decremented by one.

5. ISUM=ISUM−Bφ—This is the operation being performed in the ISUM register 122.3. Bφ represents the NDLTX value and this value representing the delta minor move is subtracted from the present ISUM value in this summation accumulator.

6. REPEAT—If the value of ISUM is not negative, the instruction is repeated on the next dequeue of the vector. The instruction will be REPEAT until the NRUN decrements negative or the ISUM decrements to become negative, which ever comes first. Note that in the case of REPEAT, the nib to be set will be only a +Y MAJOR move.

7. BN ALU To ISUM=ISUM+Aφ—If the ISUM register 122.3 has decremented to a negative as determined by ALU 128 substracting the NDLTX value from the ISUM value, then the major move NDLTY at Aφ is added to the present ISUM value. Note in the case of this instruction, the nib to be set will be after a +Y MAJOR and +X MINOR move.

8. BR To 92φ—All functions having been accomplished, the instruction calls for a branch to 92φ which is the queue cycle. The vector is returned to the current band table 238 via the then existing QUEUE address, loading of the address done on a clocked LOAD MAR signal and vector values sent via bus 130 into and accepted by memory per a VECTOR WRITE CUE. Note that in the performance of this function, the TRI MUX state of the parallel registers 122 holding vector values are placed in a condition wherein the register contents are received on subbuses 181-187 via the trimuxes 180 and register data buses 190 with the parallel registers being not enabled at 151.

9. BN NRUN To 9φφ—If the NRUN value in the NRUN register 122.8 goes negative, this means that the vector to raster conversion for this vector has been completed and a branch to 9φφ is made, which is VECTOR COMPLETE. At this time, a dequeue flag is decoded. The process continues on the dequeue cycle with processing of the next vector in the current band table 238 according to its VTYPE.

4. PROCESSOR OPERATION

Figure 14:
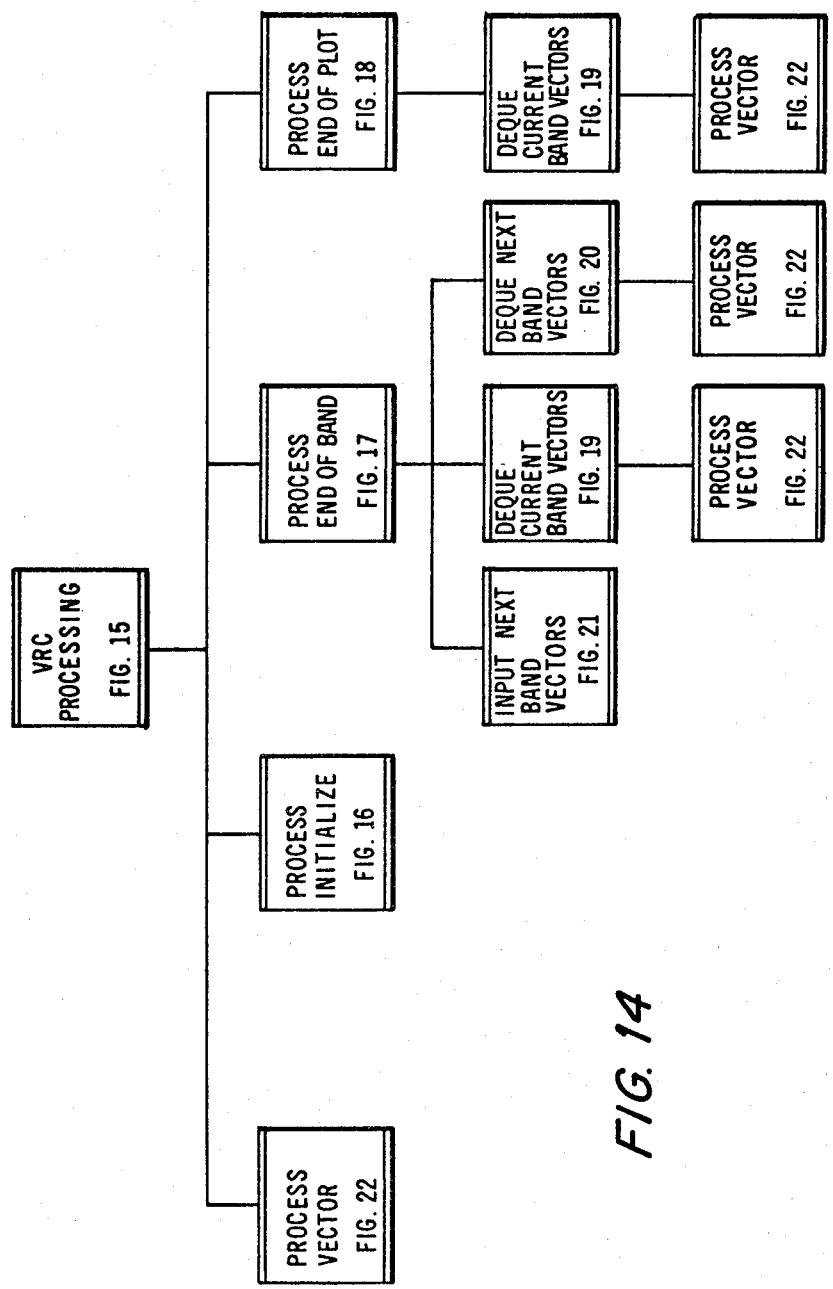
FIG. 14 is a composite functional diagram illustrating the functional association of the flowcharts of FIGS. 15-22.

Reference is now made to FIG. 14 which shows a overview for the vector to raster conversion (VRC) processing. FIG. 14 represents a composite of major routines for VRC processing shown in the flowcharts of FIGS. 16 through 22 with FIG. 15 being the main flowchart of VRC PROCESSING.

Figure 15:
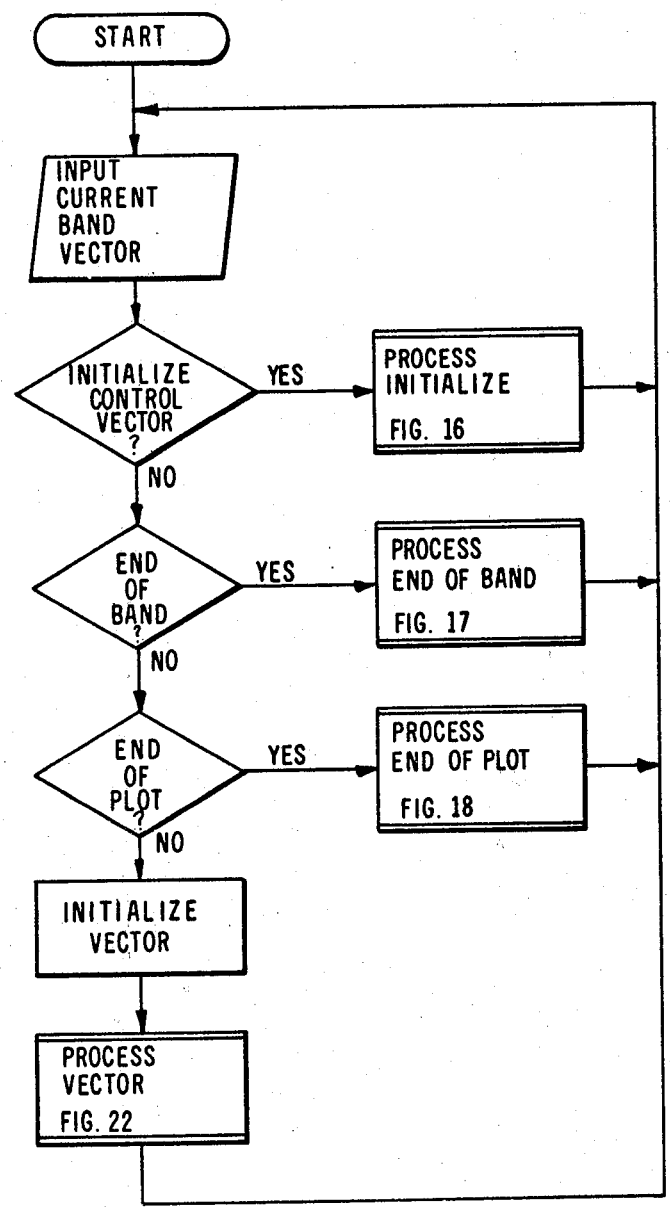
FIG. 15 is a functional flowchart illustrating basic process of vector to raster conversion.
Figure 16:
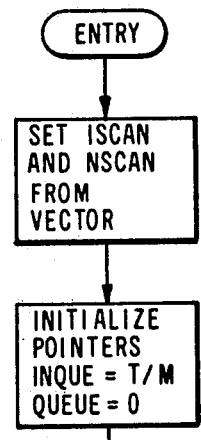
FIG. 16 is a functional flowchart illustrating the vector initializing process.
Figure 17:
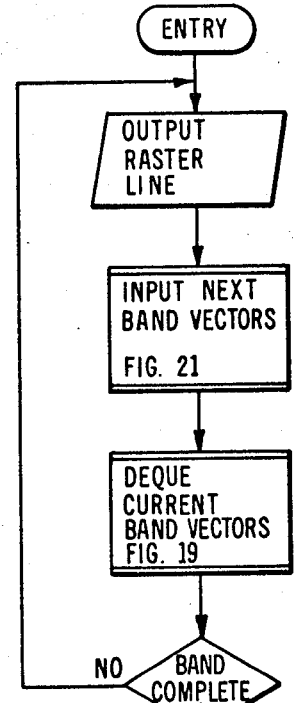
FIG. 17 is a functional flowchart illustrating the end of band process.
Figures 18, 19:
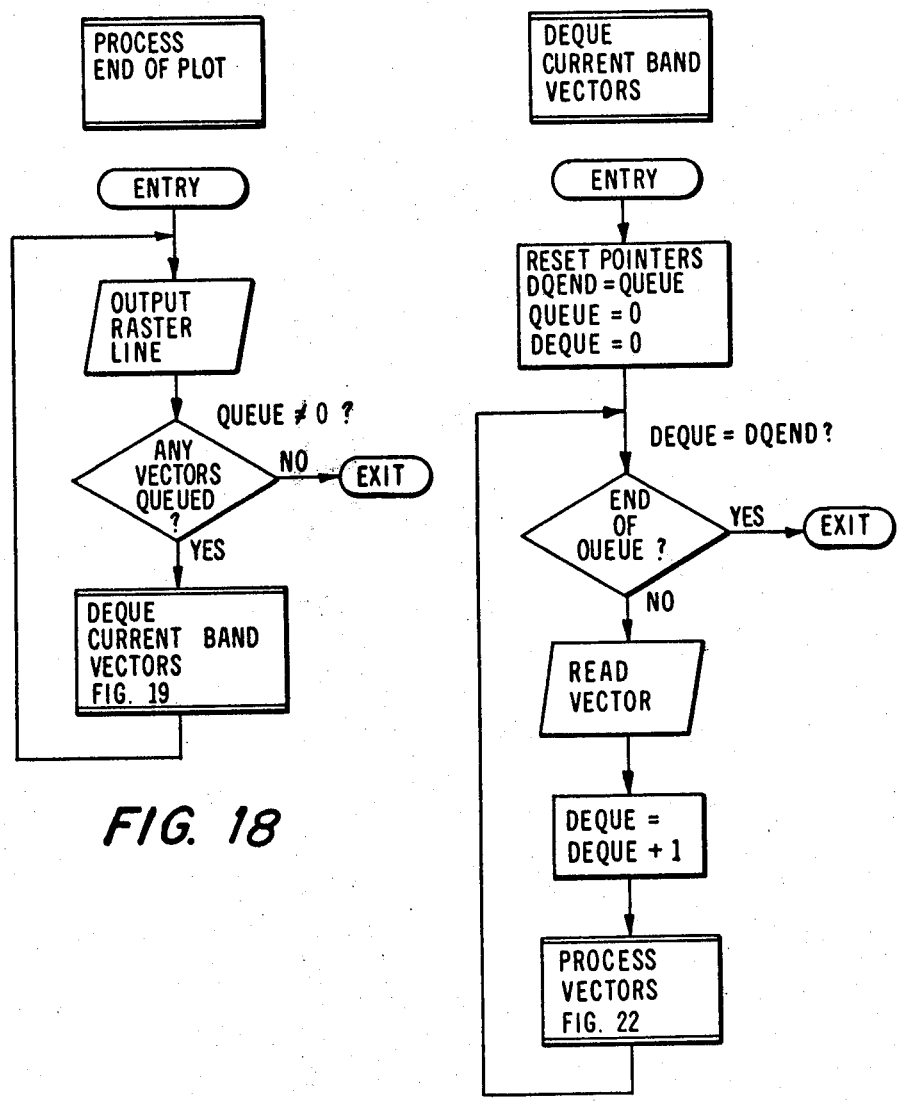
FIG. 18 is a functional flowchart illustrating the end of plot processing.
FIG. 19 is a functional flowchart illustrating the dequeue cycle of current band vectors.
Figures 21, 22:
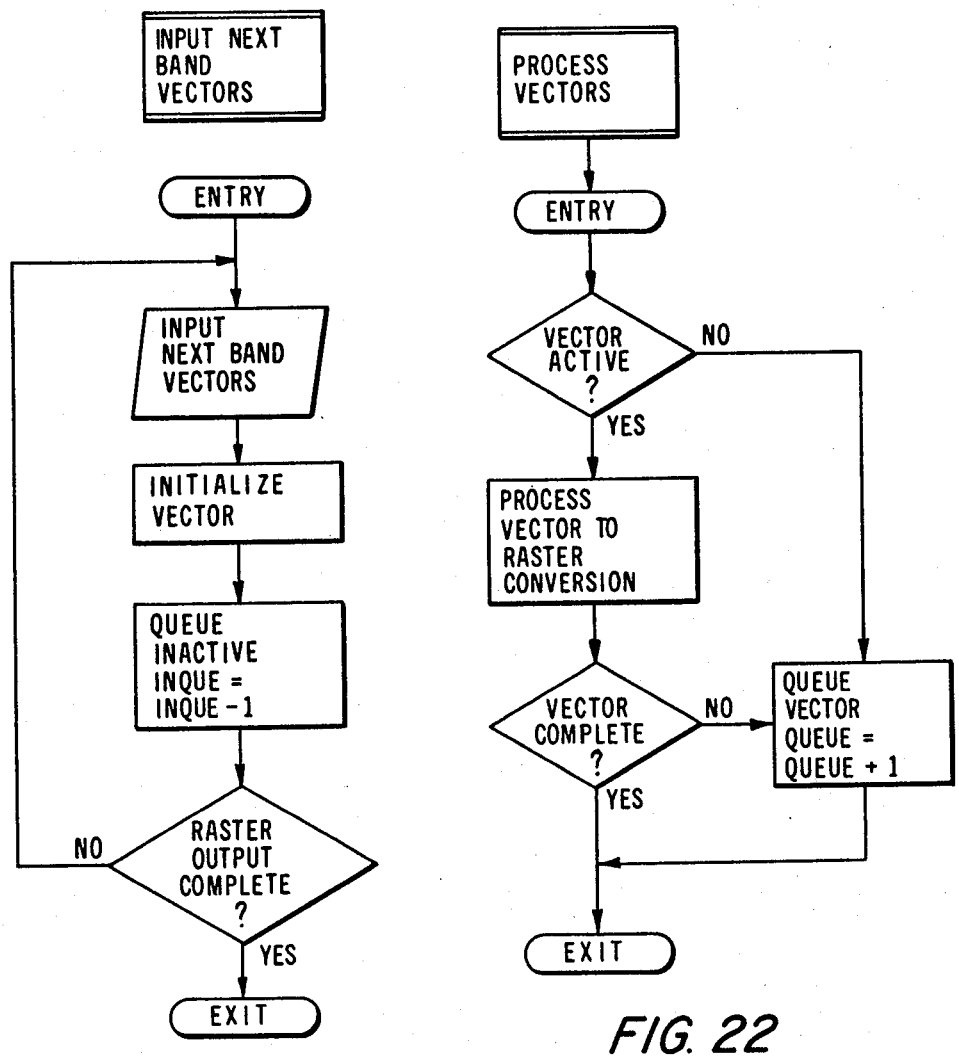
FIG. 21 is a functional flowchart illustrating the procedure for processing the next band vectors.
FIG. 22 is a functional flowchart illustrating the procedure for basic processing of each vector to raster conversion in a plot.

VRC PROCESSING of FIG. 15 references four other routines, PROCESS INITIALIZE, FIG. 16, PROCESS END OF BAND, FIG. 17, PROCESS END OF PLOT, FIG. 18 and PROCESS VECTOR, FIG. 22.

PROCESS END OF BAND will require a dequeue cycle for the current band vectors via DEQUE CURRENT BAND VECTORS, FIG. 19 and PROCESS VECTOR, FIG. 22. If processing of the first scan line $X_\phi$ of the next band is active, then the dequeue cycle will finish the current band vectors and start the next band vectors via DEQUE NEXT BAND VECTORS, FIG. 20 and PROCESS VECTOR, FIG. 22. During PROCESS END OF BAND, vectors for the next vector band may be received via INPUT NEXT BAND VECTORS, FIG. 21.

PROCESS END OF PLOT will require a dequeue cycle of current band vectors to their completion via DEQUE CURRENT BAND VECTORS, FIG. 19 and PROCESS VECTOR, FIG. 22.

Explanation is now made of VRC PROCESSING shown in FIG. 15. It is assumed that the activate code has been recognized and the I/O mode control 64 has converted operation from the TRANSPARENT mode to the ACTIVE mode.

The first function is to input current band vectors via the I/O interface 20 (input current band vector). The first vector is checked to see if it is an initialize control vector. If it is a initialize control vector, a PROCESS INITIALIZE routine is commenced. Referring to FIG. 16, this routine is started with a set ISCAN value in the ISCAN register 122.1 and also the receipt and store of the NSCAN value from this control vector. Also at this time, the QUEUE pointer 241 would be set to zero and the INQUE pointer 244 would be set at its zero position at the top of memory (T/M).

Programming returns to FIG. 15 with PROCESS INITIALIZE complete. The next vector is received (input current band vector). This vector will most likely be a standard vector so that the functions, initialize vector, end of band and end of plot would result as "no". The vector is initialized to its computational values (initialize vector) and proceeds to PROCESS VECTOR in FIG. 22. In FIG. 22, it is determined if the vector is active or not active. If it does not begin in scan line $X_\phi$ of the current band, then it is queued into table 238 via QUEUE pointer 241 pointer address is incremented by one. The program then returns to FIG. 15 for input of the next vector (input current band vector).

If the vector is active, the vector is processed for raster conversion as shown in FIG. 22. After conversion, the vector is checked to see if it is complete or is still active. If it is complete, for example, a "Y only" type of vector, the program returns to FIG. 15 to input the next vector. If the vector is not complete, i.e., still active, the vector is queued to table 238 and the QUEUE pointer 241 is incremented by one and the program returns to FIG. 15 to input the next vector (input current band vector).

This processing continues for the all of the incoming vectors for the current band, following the routine in FIG. 15 through the PROCESS VECTOR routine of FIG. 22.

After the current band standard vectors have been received, an end of band (EOB) control vector is next to be received from the host system 12. The end of band is detected and programming branches to the PROCESS END OF BAND routine in FIG. 17. In FIG. 17, the previously processed raster scan line is placed on output from the I/O interface 20. During the performance of this function, the input of vectors for next band is commenced under the INPUT NEXT BAND VECTORS routine in FIG. 21. In FIG. 21, a vector for the next band is received via the I/O interface 20, the vector is initialized to its computational values and the vector is queued into the next vector table 240 as an inactive vector via the INQUE pointer 244 and the INQUE pointer 244 is decrement by one address (Queue inactive and INQUE=INQUE−1).

Next the raster output for the previous scan line is checked to see if it has been completed. If not completed, another vector in the next vector band is received, initialized and queued into the next band table 240. This process is continued until there is an indication that the raster output is complete at which time the program branches back to PROCESS END OF BAND, FIG. 17, proceeds into a dequeue cycle, DEQUE CURRENT BAND VECTORS, FIG. 19.

In this routine, the DQEND pointer is set equal to the QUEUE pointer, the QUEUE pointer is set equal to zero and the DEQUE pointer is set equal to zero.

If DEQUE is equal to DQEND (for example, a blank section in the plot containing no vector information), the program is returned to the PROCESS END OF BAND routine in FIG. 17. If DEQUE is not equal to DQEND, then a vector will be read out of the first position in the current band table 238 and the DEQUE pointer 242 will be incremented by one address and the vector will be processed according to the PROCESS VECTOR routine of FIG. 22, already explained, processing the vector to raster scan if the vector is active and queuing the vector back into the current band table 238 via the QUEUE pointer 241 if the vector is still active. If the vector was originally inactive in the current band, the vector is immediately queued back into the current band table 238. The branch is made back to the routine in FIG. 19 with a loop around to "end of queue", where a check is made to see if DEQUE is equal to DQEND. If not, the dequeue process continues, as just explained, with vectors being accessed from the table 238, requeued to the table if inactive or processed if active and requeued to the table if still active.

The DEQUE CURRENT BAND VECTORS routine of FIG. 19 involves processing vectors for each scan line while the PROCESS END OF BAND routine of FIG. 17 involves processing of each scan line in a vector band.

At some point in time, DEQUE will equal DQEND, at which time the program returns to the routine of FIG. 17. A check is then made to determine if the band is complete, i.e., have all the raster scan lines been completed for the current band. If not, the program returns to raster output the previously scan line. During this time, more vectors from the next band may be received and initialized. After raster output, the dequeue cycle is commenced and vectors are processed accordingly until processing of the last scan line, $X_{NSCAN-1}$, of the current band. While this last scan line is placed on output, further vectors for the next band may be received, processed, initialized and queued into the next band table 240.

Next, the current band vectors remaining in the table 238 and extending into the next vector band will be processed under the dequeue cycle (FIG. 19), as before. During this dequeue cycle via FIGS. 19 and 22, processing of scan line $X_\phi$ of the next band is commencing.

After completing the dequeue cycle for current band vectors (DEQUE=DQEND), and exit back to FIG. 17, a check with "band complete?" will show "yes", since the previous band has been completed. At this time, the dequeue cycle for the next band vectors will commence in accordance with the DEQUE NEXT BAND VECTORS routine of FIG. 20. These are all the vectors that we have previously been initialized and read into the next band table 240.

Figure 20:
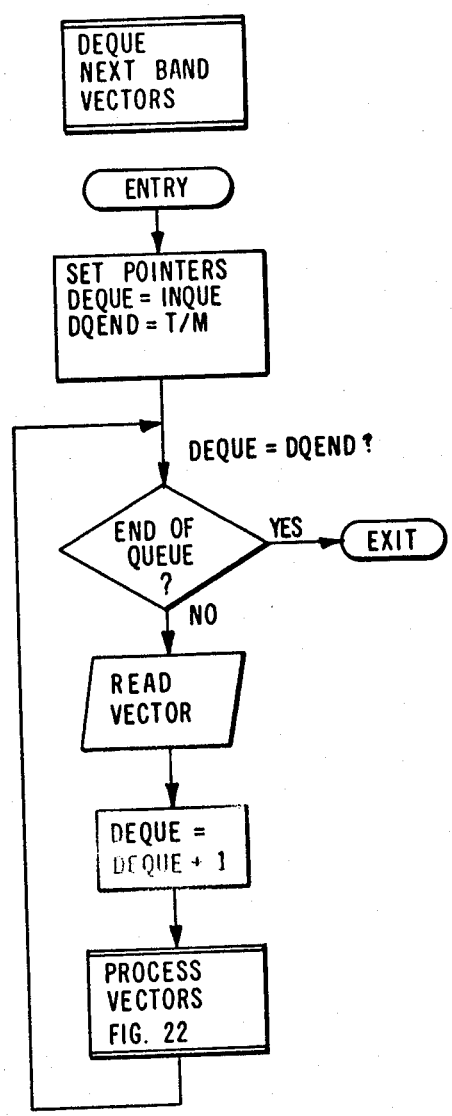
FIG. 20 is a functional flowchart illustrating the dequeue cycle for next band vectors.

In FIG. 20, upon entry, the pointers are set with the DEQUE pointer 242 set equal to the address of the INQUE pointer 244 and the DQEND pointer 243 set to the address at the top of memory (T/M). The routine is identical at this point to the DEQUE CURRENT BAND VECTORS routine in FIG. 19. The only difference is that the dequeue cycle for next band table is LIF0 while the dequeue cycle for the current band table is FIF0. This is of no consequence because final ordering is accomplished by the processor itself.

With DEQUE not equal to DQEND, the vectors in the next band table 240 are read, the DEQUE pointer 242 is incremented by one address, and the vector is processed if active or requeued if inactive. After processing, the vector is requeued if still active. Note that requeuing in either case is via the QUEUE pointer 241 into the next available address in the current band table 238, which pointer is already positioned above the previously dequeued and requeued extended current band vectors.

Returning to FIG. 20, once the DEQUE value equals the DQEND value, we have reached the top of memory and the program exits back to FIG. 17 which in turn, exists back to FIG. 15 and out of the PROCESS END OF BAND routine and from there, back to the beginning of the VRC PROCESSING procedure.

At this time, vectors will be received for the remainder of the next vector band, if there are any such vectors that have not been received from the host system. These vectors are initialized and processed according to the PROCESS VECTOR routine of FIG. 22, as previously explained, thereby completing the vector processing for scan line $X_\phi$ of the next vector band. Truly, this band has now become the current vector band.

The next vector from the host system (input current band vector) will be an EOB control vector for the new current band. The end of band code is detected and the program is branched to the PROCESS END OF BAND routine in FIG. 17 and the processes explained relative to EOB processing are repeated.

This process is repeated for all vector bands followed by an EOB code (see FIG. 4a) until the last vector band of the plot is received followed by an end of plot (EOP) code. This control vector is detected at "End of Plot" check in FIG. 15 followed with a branch to the PROCESS END OF PLOT routine shown in FIG. 18.

Upon entry in FIG. 18, the previously processed raster line in buffer 102 is placed on output to the printer/plotter. Note that there are, of course, no vectors to process in a next band, as in the case of the PROCESS END OF BAND routine of FIG. 17. A check is then made to see if any vectors are queued in the current band table 238, i.e., is the QUEUE pointer 241 not at its zero position. If "yes", the current band vectors are processed according to DEQUE CURRENT BAND VECTORS routine of FIG. 19 and vectors in this last band processed according to the PROCESS VECTOR routine of FIG. 22, all as explained previously. Upon the completion of this dequeue cycle, the raster scan line processed will be placed on output to the printer/plotter and a check again will be made to determine if any vectors are still queued. If so, the process for EOP is repeated until the check determines that the QUEUE pointer 241 is at its zero position, at which time there is an exit and the plot is complete since there is no more vectors in the vector memory to be processed.

At this time, the clocks of the CPU 22 are stopped and all processing ceases. The processor reverts back to the TRANSPARENT mode until another activate code is received from the host system 12 to activate the processor to the ACTIVE mode and begin again the VRC PROCESSING of FIG. 15.

Figure 23:
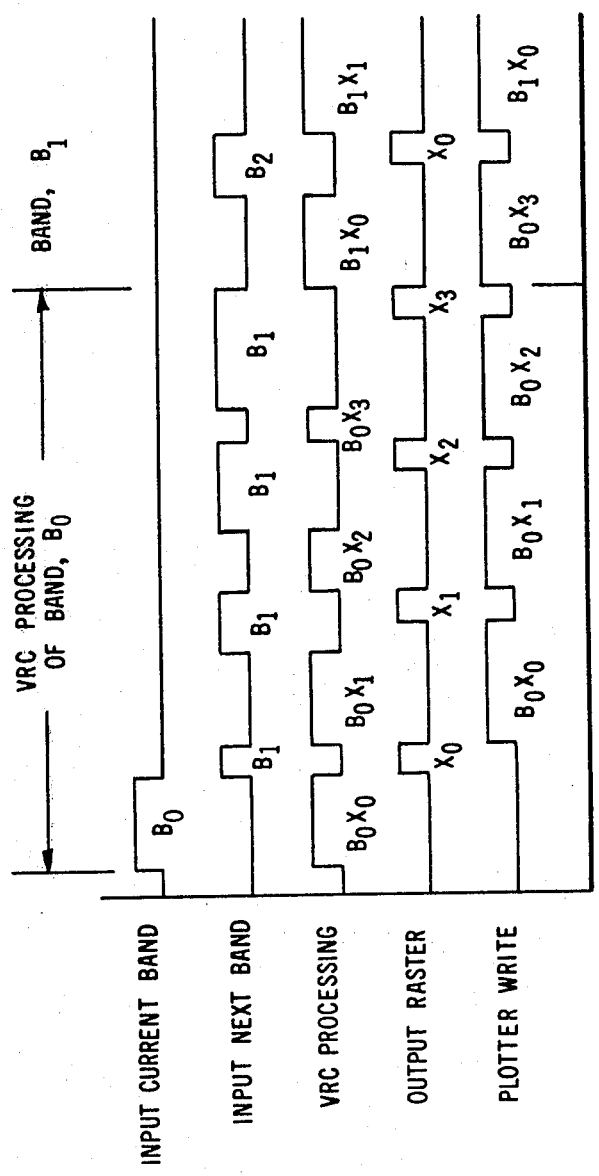
FIG. 23 is a timing diagram exemplifing vector to raster processing for a plot having normal vector density.

Reference is now made to FIG. 23, which shows the normal timing relationship for the processor 10. This timing diagram shows the timing relationship between five different functions, the first four of which relate to the processor 10 and the last relating to the printer/plotter 18. The first time line represents the receipt of vector data 14 for the current band. The second time line represents the receipt of vector data for the next band. The third time line represents when the processor is performing vector to raster conversion. The fourth time line represents when the processor is placing a raster scan line on the output of buffer 102. The fifth line represents when the printer/plotter 18 is printing out the raster scan line received from the processor 10.

The processor 10, in the ACTIVE MODE, will receive vectors for the current band, which is band $B_\phi$, and will immediately process to raster conversion vectors for the first scan line $X_\phi$ of band $B_\phi$ as these incoming vectors are initialized.

At some point in time (about 3 milliseconds), the vectors for the first band $B_\phi$ will be completed and followed by an EOB control vector. The processor will proceed into an output raster cycle, placing scan line $X_\phi$ on output to the printer/plotter. This would typically take 1 millisecond. During this output raster cycle, vectors for the next band are read ahead since raster to vector conversion is not possible because the raster scan buffer 102 is busy. Vectors will be received for the next band, $B_1$, until such time that raster output of line $X_\phi$ is complete.

Upon completion of raster output of line $X_\phi$, the printer/plotter will begin its write cycle (which will typically take about 4 milliseconds). The processor proceeds with vector to raster conversion for scan line $X_1$. Because the processor 10 can quickly handle the vector access and store to memory and the vector to raster processing, processing for scan line $X_1$ of band, $B_\phi$ will be completed prior to the completion of the printer/plotter in printing out scan line $X_\phi$. Therefore, the processor 10 will have time to receive further vectors for the next band, $B_1$. This continues until the printer/plotter has completed the write cycle for scan line $X_\phi$ and the processor has placed on output all of scan line $X_1$.

The foregoing time related processing continues until the last scan line, $X_3$, of band $B_\phi$ has been processed and placed on output to the printer/plotter.

The vectors for the next band $B_1$ have all been received at this point in time. The vector to raster processing of each successive scan line $X_2$ and $X_3$ has been accomplished in a shorter period of time since some vectors in band $B_\phi$ have become completed with vector processing through band $\phi$. This provided additional time for receiving vectors in the next band $B_1$, while waiting for the printer/plotter to complete its printing cycle relative to the previously received scan line. Also, the processor has maintained the operation of the printer/plotter at its maximum level.

Figure 24:
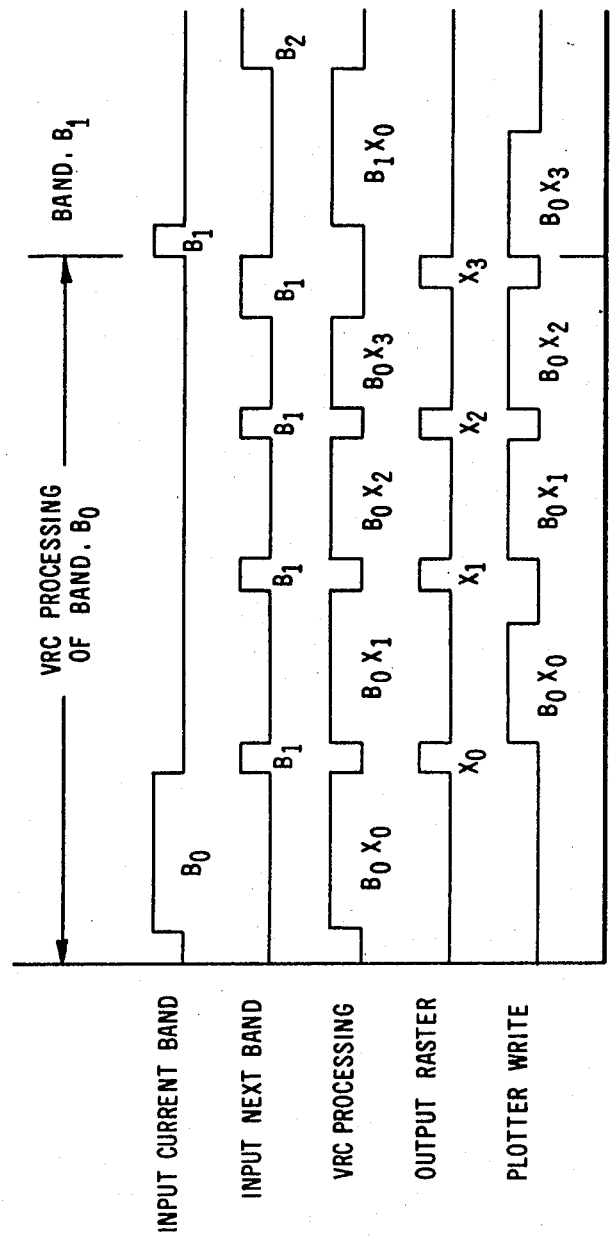
FIG. 24 is a timing diagram exemplifing vector to raster processing for a plot having heavy vector density.

In FIG. 24, an extremely dense plot is exemplified, showing the timing relationship when the processor initially cannot process the vectors at the maximum operating level of the printer/plotter. The timing relationship is the same as explained in FIG. 23. However, due to the density of the plot, the vector to raster processing for the initial scan lines, such as, scan lines $X_\phi$ and $X_1$ of band $B_\phi$, will take a longer period of time than the time required for the printer/plotter write cycle for a single scan line. At any rate, vectors for the next band $B_1$ are received during the raster output cycle. By the time of the output of the last scan line $X_3$ of band $B_\phi$ has been reached, the processor 10 is able to operate the printer/plotter at its maximum level as well as have more time to receive vectors in the next band $B_1$. Upon completion of band $B_\phi$, the input of the vectors will be completed for band $B_1$ prior to vector to raster processing of scan line $X_\phi$ in band $B_1$. During this period of time, scan line $X_3$ of band $B_\phi$ is being processed by the printer/plotter.

5. VECTOR TO RASTER EXAMPLE

Figure 25:
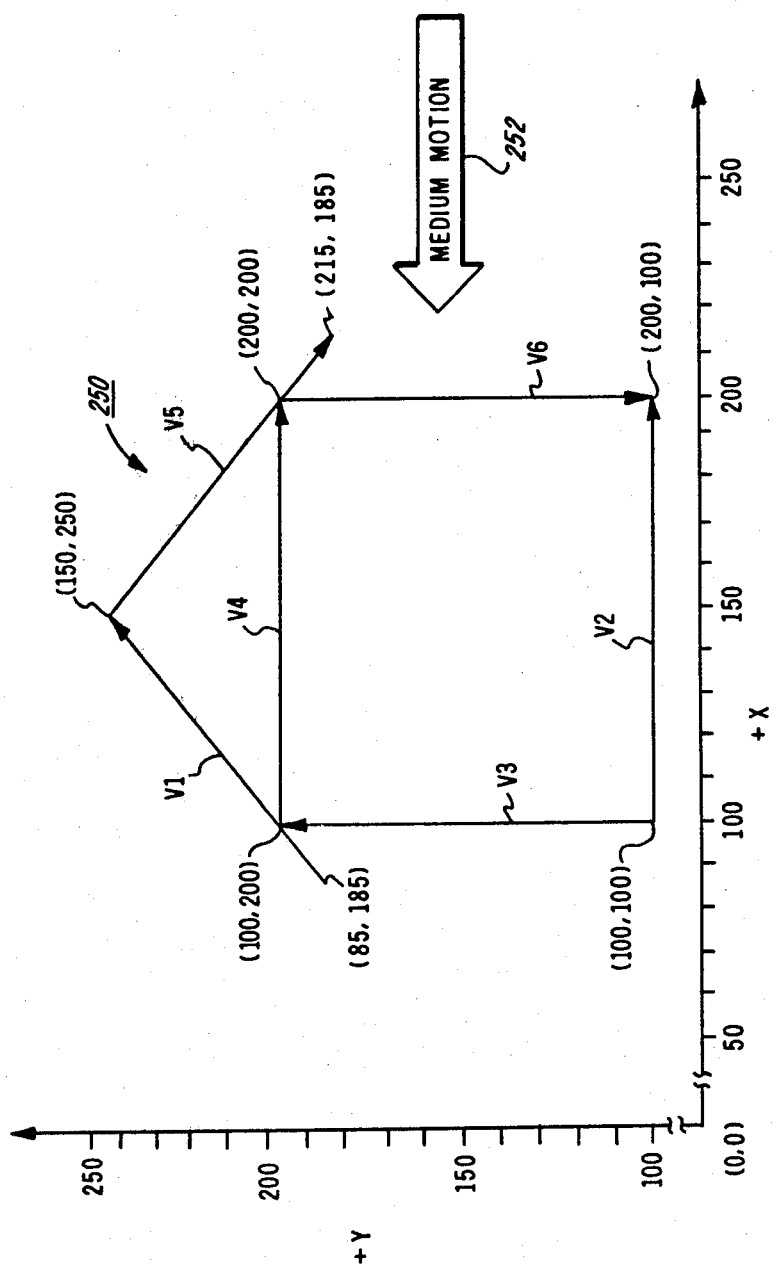
FIG. 25 is an example of a plot to illustrate the functioning of the processor architecture and processor operation.

Reference is now made to an example of a plot in the form of a house 250 comprising six vectors, V1 through V6, shown in FIG. 25. For convience, a scale is shown for the X and Y coordinates and is indicative of the scan line coordinate in the X direction and the nib coordinate in the Y direction. The Y axis therefore, might be considered the nib array of the printer/plotter being incremented per scan line in a direction opposite to medium motion 252.

In FIG. 26, the vector coordinates (IX1, (IY1), (IX2), and (IY2) in the block diagram are the actual coordinates of the vectors V1-V6 of the house 250. The vector coordinates $IX\phi$, IY1, NDLTX and IY2 are those prepared by the host system 12 for the control and standard vectors and received by the processor 10 as explained in connection with FIG. 4.

The processor 10, being first in the TRANSPARENT mode, detects, at the I/O mode control 64, the activate code and the byte count, BYTCNT.

The following discussion may be paralleled to the previous discussion of FIGS. 15 et al.

The first vector expected is a control vector in the form of a initialize plot command. The initialize vector is detected (FIG. 26) as a control vector by the $IX\phi$ value being a $-1$ and an initialize plot command by the IY1 value being a $-1$. The NDLTX position indicates ISCAN value 880, which is the number of bytes per scan line for a 36 inch wide plotter. The IY2 position indicates the number of scan lines per band, which, for this example, is 10. At this time the QUENE and INQUE pointers 241 and 244 are initialized. In this connection, see FIG. 16.

The next step is the input of another vector which turns out to be an EOB control vector with the 'KNT' value being 8. Referring to FIG. 15, the PROCESS END OF BAND routine of FIG. 17 is followed for 8 end of band cycles without standard vector information. The record medium is therefore increment 80 scan lines (8 bands of 10 scan lines each).

During the 8 EOB processing, vector V1 can be read ahead into the next band table 240 but for the purposes of this example, vectors will not be considered read ahead except for the immediate next band.

During the processing of band 7, the vector V1 will be received and detected as a standard vector. The vector V1 is initialized to its computational values and is queued "inactive" into the current vector band table 238, since there is no vectors previously present in the table. The vector is inactive because it $IX\phi$ value is 5, indicating that it starts on scan line $X_5$ in vector band 8 and, therefore, is initialized and queued immediately.

The next vector input is a control vector in the form of an EOB code. The $IX\phi$ value is $-1$, indicating that it is a control vector, the IY1 equal to zero, indicating that it is an EOB code. The IY2 position indicates the 'KNT' value of 2. Thus, the processor will process vector V1 for 2 bands, 8 and 9, following the procedure of FIG. 17.

At scan line $X_5$ in band 80, vector V1 becomes active, as it is dequeued from the current band table 238, is vector to raster processed for this scan line and, then, requeued. This processing continues for scan lines 80-99. During the output raster cycle for these scan lines, the next three vectors V2, V3, and V4 are received, since they start in the "next" vector band after the processing of the current 'KNT' EOB of 2 bands. These three vectors are initialized and stored into the next vector band table 240 via the INQUE pointer 244.

At scan line 100 (band 10, scan line $X_\phi$), the current vector band table 238 is processed under the dequeue cycle (DEQUE CURRENT BAND VECTORS, FIG. 19) with vector to raster processing of vector V1 and requeue to table 238. The next vector band table 240 is processed under a deque cycle (DEQUE NEXT BAND VECTORS, FIG. 20) with raster conversion, and requeue of vectors V2 and V4 into the current band vector table 238. Vector V3 is not requeued since it starts and ends on scan line $X_\phi$, in band 10, then being actively processed.

At this time, an EOB control vector is detected ($IX\phi = -1$ and IY1=0) with a 'KNT' value of 5. The processor follows the routine in FIG. 17 for 5 bands, processing vectors V1, V2 and V4 from scan line $X_\phi$ of band 10 to scan line $X_9$ of band 14 (5 bands of 10 scan lines each). For each scan line, vectors V1, V2 and V4 are dequeued, raster converted and requeued to table 238 as each scan line is processed. During the output raster cycles for these scan lines, vector V5 is received, initialized and stored into the next vector band table 240 via INQUE pointer 244. At scan line $X_9$ of band 14, vector V1 is completed (as detected by the NRUN register) leaving only vectors V2 and V4 active and in the current vector band table 238.

At scan line $X_\phi$ of band 15, the current band vector table is processed to dequeue, raster convert and requeue of vectors V2 and V4. The next band vector table 240 is then processed to vector dequeue, raster conversion of vector V5. Vector V5 is requeued into the current vector band table 238. This dequeue procedure follows the routine of FIG. 17 from DEQUE CURRENT BAND VECTORS through a band complete "yes" to DEQUE NEXT BAND VECTORS.

At this point in time, an EOB control vector is received ($IX\phi = -1$ and IY1=0) with a 'KNT' value 5 (IY1=5). The processor 10 will process 5 EOB cycles (FIG. 17) from scan line $X_1$ of band 15 to and including scan line $X_9$ of band 19. For each scan line, vectors V2, V4 and V5 are dequeued, raster converted, and requeued to the table 238. During the output raster times, of band 19, vector V6 is received, initialized and stored into the next vector band table 240 via INQUE pointer 244.

At scan line $X_\phi$ of band 20 (scan line 200), vectors V2 and V4 will have been completed, as indicated by their NRUN values, leaving only vector V5 active and in the current vector band table 238.

Process for scan line 200 (band 20, scan line $X_\phi$) commences with a dequeue cycle for the current vector band table 238, vector V5 being processed to dequeue, raster convert and requeued to table 238. Following the procedure of FIG. 17 (band complete equal "yes"), the dequeue cycle continues for the next vector band table 240 (DEQUE set equal to INQUE and DQEND set to the top of memory). Vector V6 is then dequeued, raster converted but not requeued, since it starts and ends on scan line 200. Only vector V5 remains in the current vector band table 238.

At this time an EOP control vector is received and read. It is detected as a control vector because the IX$\phi$ value is $-1$ and is detected as an EOP code because the IY1 value is 1. See FIG. 4. The processor 10 then follows the procedure of FIG. 18, processing vector V5 in the current vector band table 238 through dequeue, raster conversion and requeue until its NRUN value is negative indicating its completion. At this time, the printer/plotter is at scan line 215 (band 21, scan line $X_5$). The QUEUE is equal to zeroand the processing of FIG. 18 exits and VRC processing terminates. The processor 10 reverts back to the TRANSPARENT mode and awaits the next activate code from the host system 12.

While the invention has been described in conjunction with specific embodiments, it isevident that many alternatives, modifications and variations will be apparent to those skilled in the art in light of the foregoing description. Accordingly, it is intended to embrace all such alternatives, modifications, and variations as fall within the spirit and scope of the appended claims.

The following appendices are included with the filing of this application showing complete details for the construction of and microcode for processor 10. These appendices can be found in the patented file at the U.S. Patent & Trademark Office.

What is claimed is:

1. In a vector to raster processor for converting vector coordinate information forming a plot into a raster scan line format for presentation to a plotter having a multi-electrode nib array constituting a scan line and addressable between incremental movements of a record medium in a direction transverse to said array comprising
   (a) means for receiving coordinate information of vectors within a current vector band, constituting a predetermined number of scan lines being one of a plurality of bands of equal but of predetermined length making up said plot, the length of said bands being largely dependent on the vector density of said plot, said vector coordinate information being received in random order within each band,
   (b) means for initializing said vector coordinate information to provide vector computational values for each vector,
   (c) means for storing said initialized vector values for each vector in parallel format in their received random order,
   (d) parallel processing means for accessing said storage means and comprising a plurality of parallel operated processor components, said parallel processing means simultaneously dequeuing in parallel format said initialized vector values, simultaneously processing said initialized vector values via one of said processor components and simultaneously requeuing in parallel format the initialized vector values in their previous stored random order into said storage means if the vector requires subsequent processing.

2. In the vector to raster processor of claim 1 wherein said initialized vector values for each vector include the incremental distance in the major axis direction, the incremental distance in the minor axis direction, slope approximation of the major incremental change relative to the minor incremental change, the number of nibs to be set for a given vector length, and the location of the address of the nib to be set for a given scan line in the current band.

3. In the vector to raster processor of claim 2 wherein there is raster buffer means to store the set nibs and means to output said raster buffer means when the nibs have been set for a given scan line in the current vector band.

4. In the vector to raster processor of claim 1 wherein said storage means also includes a section for inputting initialized vector coordinate information for the next vector band, the amount of storage in said next vector band section governed by the amount of storage available in storing and processing the initialized vector values for the vectors in the current vector band.

5. In the vector to raster processor of claim 1 wherein one of said initialized values comprises the vector type indicative of predetermined vector orientation relative to known Cartesian coordinates.

6. In the vector to raster processor of claim 5 wherein said parallel processing means includes means to process each vector for rasterization according to its vector type.

7. In a vector to raster processor for converting vector coordinate information into a raster scan line format for presentation to a terminal device, said coordinate information comprising a plurality of vectors constituting an original plot, each vector having a set of computed vector values, said processor characterized by
   parallel processing means which includes a plurality of parallel computational component means,
   vector memory means coupled to said computational component means to store in parallel format said vector value sets,
   said vector value sets received in random order in said vector memory means and not reordered therein to one or more of their computed vector values, and
   said vector value sets being retrieved in parallel format from said vector memory means and processed in parallel by said computational component means in their randomly received and stored order with final ordering of vectors falling in any given raster scan line being accomplished by queuing all of the stored vector value sets and requeing them into said vector memory means if the vector extends into the next raster scan line.

8. In the vector to raster processor of claim 7 wherein said vectors are received in vector bands, the total of said bands comprising the original plot, each band constituting a predetermined number of raster scan lines, said number based upon the density of vectors in the original plot.

9. In the vector to raster processor of claim 8 wherein said vector memory means comprises a section for vector value sets for a current vector band and a section for some or all of the vector value sets in the next vector band, the amount of storage in said next vector band section governed by the amount of storage available in storing and processing vector value sets for vectors in the current vector band.

10. In the vector to raster processor of claim 7 wherein one of said computational component means designates vector type as one of said computed vector values for each of said vectors and code subroutine means in said parallel processing means for processing the vector value sets in accordance with the designated vector type.

11. In the vector to raster processor of claim 7 wherein said vectors are received in bands of vector, said bands comprising said plot in its entirety.

* * * * *